(12) United States Patent
Yamaguchi et al.

(10) Patent No.: US 8,010,224 B2
(45) Date of Patent: Aug. 30, 2011

(54) AUTOMATIC CUTTING DEVICE AND PRODUCTION METHOD FOR BEVELED PRODUCT

(75) Inventors: Yoshihiro Yamaguchi, Komatsu (JP); Ikuo Kamada, Komatsu (JP); Takahiro Iriyama, Komatsu (JP)

(73) Assignee: Komatsu Industries Corporation, Komatsu-shi, Ishikawa (JP)

( * ) Notice: Subject to any disclaimer, the term of this patent is extended or adjusted under 35 U.S.C. 154(b) by 811 days.

(21) Appl. No.: 12/083,374

(22) PCT Filed: Oct. 27, 2006

(86) PCT No.: PCT/JP2006/321516
§ 371 (c)(1),
(2), (4) Date: Apr. 10, 2008

(87) PCT Pub. No.: WO2007/049751
PCT Pub. Date: May 3, 2007

(65) Prior Publication Data
US 2009/0250445 A1 Oct. 8, 2009

(30) Foreign Application Priority Data
Oct. 27, 2005 (JP) .................................. 2005-313213

(51) Int. Cl.
*G05B 19/402* (2006.01)
*G05B 19/406* (2006.01)
*B23K 26/38* (2006.01)
*B23K 31/10* (2006.01)

(52) U.S. Cl. .............. 700/173; 219/121.83; 219/121.54; 83/74; 382/152

(58) Field of Classification Search ............. 219/121.67, 219/121.72, 121.83, 121.11, 121.44, 121.54, 219/69.1; 700/173, 193; 83/74; 348/161; 382/152
See application file for complete search history.

(56) References Cited

U.S. PATENT DOCUMENTS

| | | | | |
|---|---|---|---|---|
| 4,031,368 A | * | 6/1977 | Colding et al. | 700/173 |
| 4,281,379 A | * | 7/1981 | Austin | 700/3 |
| 4,653,399 A | * | 3/1987 | Kuehfuss | 101/485 |
| 5,975,743 A | * | 11/1999 | Bercaits | 700/134 |
| 6,326,588 B1 | | 12/2001 | Neubauer et al. | |

FOREIGN PATENT DOCUMENTS

| | | |
|---|---|---|
| EP | 1 342 527 A1 | 9/2003 |
| JP | 62-212089 A | 9/1987 |
| JP | 08-267232 A | 10/1996 |
| JP | 11-057998 A | 3/1999 |
| JP | 11-057999 A | 3/1999 |
| JP | 11-320143 A | 11/1999 |
| JP | 2002091523 A  * | 3/2002 |
| JP | 2003-251464 A | 9/2003 |

* cited by examiner

*Primary Examiner* — Samuel M Heinrich
(74) *Attorney, Agent, or Firm* — Posz Law Group, PLC

(57) ABSTRACT

A plasma cutting device performs cutting in a plurality of stages. In a first cutting sub-process, a manufactured product is cut out from a base material upon a stage according to an NC program. Next, images of respective regions in the vicinities of proper positions at two corner points of the manufactured product which has been cut out are photographed by an image sensor, the actual positions of these two corner points of the manufactured product are detected from these images which have been photographed, and the translation distances and the rotational angle between the actual positions which have been detected and the proper positions are calculated. The NC program is corrected. And, in a subsequent cutting sub-process, additional cutting for beveling is carried out upon cutting surfaces at the outer circumference of the manufactured product, according to the corrected NC program.

17 Claims, 12 Drawing Sheets

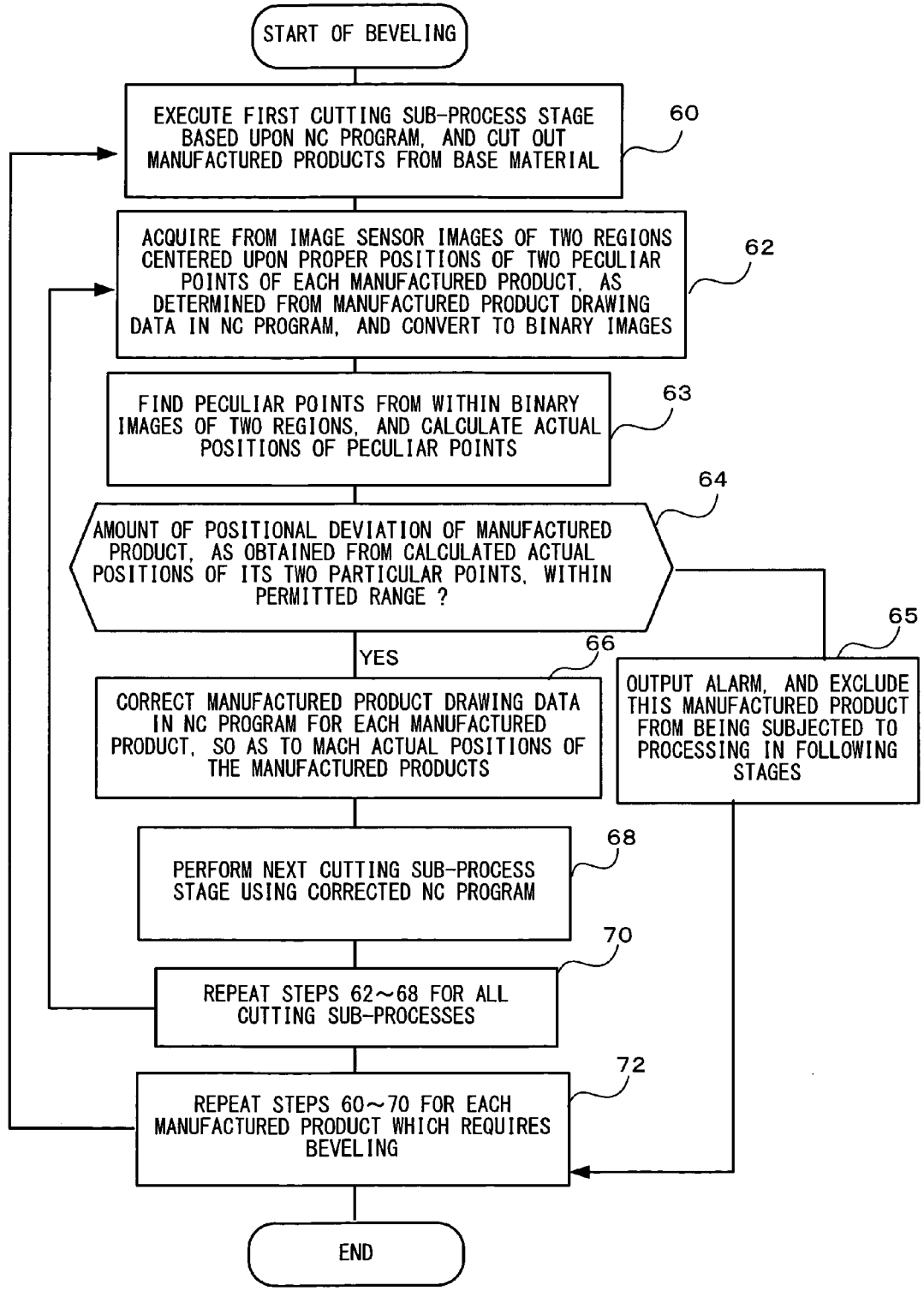

AUTOMATIC CUTTING DEVICE AND PRODUCTION METHOD FOR BEVELED PRODUCT

CROSS-REFERENCE TO RELATED APPLICATION

This application is a U.S. national stage application of PCT/JP2006/321516 filed on Oct. 27, 2006, which is based on Japanese Patent Application No. 2005-313213 filed on Oct. 27, 2005, the disclosures of which are incorporated herein by reference.

FIELD OF THE INVENTION

The present invention generally relates to an automatic cutting device for cutting out a manufactured product from a base material using a laser cutting torch, a gas cutting torch, or some other cutting tool, and in particular relates to an automatic cutting device and a production method for a beveled product, which can perform a beveling or chamfering process upon a cut surface of a manufactured product which has been cut out.

BACKGROUND ART

With manufactured products which are cut out by plasma cutting, laser cutting, gas cutting, or some other cutting method, in order to enhance the product quality of welding which is to be performed subsequently or to attain some other objective, it is not uncommon also to require a beveling or chamfering process (both of which will subsequently be termed "beveling") to be performed upon the cut surface at the outer surface of these manufactured products. For example, in the case of manufactured products which are to be used as components for the body or the frame of a construction machine, beveling is requested in about 70% of cases. Although beveling may be divided into many different types according to the shape of the processed surface, according to many of these types of beveling, the surface which has been beveled consists of a combination of two cut surfaces whose angles with respect to the main surface of the manufactured product are different. This type of beveling is implemented via two cutting sub-process stages, in order to form each of these two cut surfaces. In the first cutting sub-process stage cutting may be performed upon the base material, for example, in the direction perpendicular to the main surface of the base material, and thus the manufactured product is cut out from this base material. Then, in the second cutting sub-process stage, bevel cutting is performed upon the external shape of this manufactured product which has been cut out in, for example, a direction which is inclined with respect to the main surface of the manufactured product, and thereby a portion of its outer edge is cut away.

With respect to beveling, certain inventions are known from U.S. Pat. No. 6,326,588 and Japanese Laid-Open Patent Publication Heisei 11-57999.

In U.S. Pat. No. 6,326,588, a method is disclosed of performing cutting for beveling in two stages. With this method, first, a manufactured product is cut out by cutting the base material vertically with a laser beam; thereafter the scrap is removed, leaving only the manufactured product; thereafter, the position of the external shape of the manufactured product is detected, and this position of the external shape which has been detected is supplied to a laser control unit; and, finally, the outer edge of the manufactured product is cut away at an angle using an inclined laser beam.

And, in Japanese Laid-Open Patent Publication Heisei 11-57999, a beveling cutting device of the following type is disclosed. That is, with this beveling cutting device, a manufactured product which has been cut out beforehand is received and is placed in a predetermined position, and the positions of a plurality of spots upon the external shape of this manufactured product are detected by using a laser sensor or the like. Based upon these positions of the plurality of spots upon the external shape which have thus been detected, the external outline of this manufactured product is perfectly defined as a union of straight lines, circles, circular arcs, or the like, and geometrical shape data are generated. The external shape of the manufactured product is then cut at an inclined angle by using this geometric shape data.

Furthermore, although this has no direct relevance to beveling, in Japanese Laid-Open Patent Publication 2003-251464, a method is disclosed for accurately determining cutting positions when cutting out manufactured products from a base material. Here, two types of method are disclosed. With the first method, the base material is photographed with a camera, the coordinates of the contour line of the base material are calculated from the image which has been photographed, and drawings of the products to be manufactured are nested within the region which can be cut, inside this contour line of the base material which has thus been calculated. And, with the second method, data is stored in advance for the size and shape of the base material, and for the size and the shape of the drawing which is to be cut out therefrom, a plurality of spots upon the base material are photographed, the contour line of the base material is calculated with these spots which have been photographed, this contour line and the data for the base material which is stored in advance are compared together, the positional deviations between these data sets are matched, and thereafter cutting out of the manufactured products is performed.

In order to enhance the working efficiency of the beveling, it is desirable to make it possible to perform the above described two or more cutting sub-process stages continuously, using a single cutting device whose cutting position can be automatically controlled by numeric control (NC). However although, in the first cutting sub-process stage, it is possible to perform the processing at a high accuracy in which the performance of NC is reflected, in the second and subsequent cutting sub-process stages, the problem arises that the accuracy of the cutting is undesirably deteriorated. The reason for this is that, when in the first stage the manufactured product has been separated from the base material, the manufactured product may move since it has lost its support from the base material, so that the relative position of the manufactured product with respect to the cutting device may deviate slightly from its original position, which is undesirable.

U.S. Pat. No. 6,326,588 and Japanese Laid-Open Patent Publication Heisei 11-57999 provide a method for performing sensing of the position of the external shape of the manufactured product, and for calculating the external outline of the manufactured product from the result of this sensing.

However, in order to calculate the external outline of the manufactured product accurately, it is necessary to sense the positions of a large number of points upon the external outline of the manufactured product. And, in order to calculate the geometric shape data which perfectly defines the external shape of the manufactured product from these detection results, it is necessary to perform a large amount of calculation processing. Furthermore, when detecting the position of the external shape of the manufactured product, it is necessary either to remove the scrap and leave only the manufactured product, as in U.S. Pat. No. 6,326,588, or to extract only the manufactured product, as in Japanese Laid-Open Patent Publication Heisei 11-57999, and to mount it upon the cutting device. Since these operations are necessary, it is inevitable that quite a long waiting time period is required between the first cutting sub-process stage and the next cutting sub-process stage, and accordingly it is difficult to make these two cutting sub-process stages succeed one another continuously in an efficient manner.

Furthermore in Japanese Laid-Open Patent Publication 2003-251464 (although this is a method for calculating the external outline of the base material, not that of the manufactured product), a method is disclosed of photographing a number of spots upon the base material with a camera and calculating contour line data of this plurality of spots, and of matching positional deviation between this contour line data of the plurality of spots, and external shape data which is stored in advance. In order to implement this method, it is necessary to discover which portion of the external shape data which is stored in advance corresponds to the contour line at the plurality of spots which have been obtained from the photographic image. However, no method for doing so is disclosed in Japanese Laid-Open Patent Publication 2003-251464. Moreover, there is no problem of scrap when calculating the external outline of the base material as in Japanese Laid-Open Patent Publication 2003-251464. By contrast, when calculating the position of the external shape of a manufactured product which has been cut out from a base material, it is necessary to eliminate any possibility of mistakenly detecting the scrap which is present around the manufactured product, as being the manufactured product.

SUMMARY

The object of the present invention is to make it possible to perform two or more cutting sub-process stages for beveling continuously, using a single cutting device whose cutting position can be automatically controlled by numeric control (NC).

The automatic cutting device according to the present invention includes: a stage for a base material to be placed upon; a cutting tool; an image sensor which has an image capture region; a tool shift mechanism for, with respect to said stage, shifting said cutting tool, changing the angle of said cutting tool, and moreover shifting said photographic region of said image sensor; and a controller which controls the operation of each of said cutting tool, said image sensor, and said tool shift mechanism, according to an NC program. And this controller includes: a first cutting sub-process control means which, according to said NC program, performs control so as to execute a first cutting sub-process of cutting said base material which has been placed upon said stage with said cutting tool and cutting out a manufactured product; an image capture control means which, after said first cutting sub-process has been executed, performs control so as set said image capture region of said image sensor to at least a single region which includes the proper positions of at least two peculiar points upon said manufactured product, which has been cut out, upon said stage which are defined by said NC program, and so as to acquire from said image sensor an image of said at least a single region; a peculiar point detection means which analyzes said image of said at least a single region which has been acquired by said image sensor, and detects the actual positions on said stage of said at least two peculiar points of said manufactured product which has been cut out; a program correction means which corrects said NC program so as to match it to the actual position of said manufactured product, which has been cut out, on said stage, according to said actual positions of said peculiar points which have been detected; and a second cutting sub-process control means which, according to said corrected NC program, performs control so as to execute a second cutting sub-process of performing additional cutting with said cutting tool upon said manufactured product, which has been cut out, on said stage.

According to this automatic cutting device, after the manufactured product has been cut out from the base material in the first cutting sub-process, an image is acquired by the image sensor of at least a single region, determined by the NC program, which includes the proper position of at least two peculiar points on the manufactured product, and, by analyzing those acquired images, the actual positions of the at least two peculiar points upon the manufactured product are detected, and, according to those actual positions which have been detected, the NC program to be used by the second cutting sub-process is corrected so as to match the actual position of the manufactured product. When cutting out the manufactured product in the first cutting sub-process, the position of this manufactured product may slightly deviate. However, as much as ever, the position of the manufactured product after this positional deviation is present in the neighborhood of its proper position if such positional deviation had not taken place. Accordingly, as described above, images are acquired of regions in the neighborhoods of the proper positions of the peculiar points, as determined from the NC program, and it is possible to detect the actual positions of the peculiar points in a simple manner, by searching for the peculiar points within these images. Furthermore, the possibility is also small of mistakenly detecting the scrap which is present around the periphery of the manufactured product as being the peculiar points, which would be undesirable. Since in this manner, based upon the actual positions of the at least two peculiar points which have been detected, it is possible to confirm the positional deviation (the translation and the rotation) of the manufactured product from its proper position, accordingly it is possible to perform correction of the NC program so as to match it to the actual position of the manufactured product. Since, due to this, the processing required for correction of the NC program between the first cutting sub-process and the second cutting sub-process becomes simple, and it is possible to shorten the time period which is required for it, accordingly it is possible to perform a plurality of cutting sub-process stages for beveling in a continuous manner.

In a preferred embodiment, corner points of the external shape of said manufactured product are used as the peculiar points of the manufactured product. Generally, the external shape of the manufactured product which has been cut out usually has two or more corner points, and moreover it almost never happens that different corner points are present within a distance range of the same order of closeness as the positional deviation of the manufactured product which takes place due to cutting. Furthermore, it is possible to discover the corner points within the image which has been acquired in a simple manner with an image analysis method of finding a plurality of line segments which make up the external outline of the manufactured product within the acquired image and the point of intersection of those line segments, or with a method of pattern matching by calculating the degree of image pattern matching between a picture element value matrix which specifies the shape of the manufactured product in the neighborhood of a corner point and various positions within the image which has been acquired, or the like. Accordingly, it is possible to detect the peculiar points in a simple manner and with good accuracy by choosing the corner points of the manufactured product external shape as the peculiar points.

In a preferred embodiment, said program correction means corrects said NC program, based upon the positional deviation between the actual detected positions of said peculiar points, and said proper positions of said peculiar points.

In a preferred embodiment, said peculiar point detection means limits the range for detection of said actual positions of said peculiar points within said acquired image, to only neighborhood ranges of said proper positions of said peculiar points within said acquired image. If this neighborhood range is limited to a small distance range of the minimum required limit from the peculiar points, then the fear of undesirably mistakenly detecting the peculiar point from the scrap which is outside the manufactured product is reduced by yet a further level.

In a preferred embodiment, said controller further comprises: a means which decides whether or not the amount of positional deviation of said manufactured product which has been cut out is excessively great, based upon the positional relationship between the actual detected positions of said peculiar points, and the proper positions of the peculiar points; and a means which cancels the execution of said second cutting process upon said manufactured product which has been cut out, if it has been decided that said amount of positional deviation is excessively great. If it has been decided that the amount of positional deviation of some manufactured product is excessively great, then there is a fear that this manufactured product will be damaged during the execution of the second cutting process, and, due to this, it is possible to avoid this problem by canceling the second cutting process.

In a preferred embodiment, said cutting tool and said image capture region of said image sensor are maintained in a fixed positional relationship, and are shifted together with one another by said tool shift mechanism. Due to this, after having cut out the manufactured product with the cutting tool, the control for shifting the image capture region of the image sensor to the proper positions of the peculiar points of this manufactured product can be performed simply based upon the above described fixed positional relationship with the coordinates of the proper positions as defined by the NC program.

In a preferred embodiment, said controller further includes: a means which performs control so as to execute, using said cutting tool, test cutting in which said test material which has been placed upon said stage is cut along a test cutting line passing through a predetermined coordinate point which has been designated by said NC program; a means which, after said test cutting has been executed, performs control so as, based upon predetermined offset data which specifies the positional relationship between the cutting position of said cutting tool and said image capture region of said image sensor, to shift said image capture region of said image sensor to a region which includes said predetermined coordinate point, and so as to acquire from said image sensor an image of said region including said predetermined coordinate point; a means which analyzes the image of said region including said predetermined coordinate point, which has been acquired from said image sensor, and detects the actual positional relationship between said cutting tool and said image capture region of said image sensor; and a means which corrects said NC program or said offset data, based upon said actual positional relationship which has been detected. Since, due to this, even if more or less derangement has taken place in the positional relationship between the cutting tool and the image capture region of the image sensor, it is possible to compensate for this derangement, accordingly the accuracy of the process is enhanced by yet a further level.

In a preferred embodiment, there are further included two or more lamps which illuminate said image capture region of said image sensor from both its sides. Since, due to this, difference in the brightness of the image which is acquired from the image sensor between the region of the manufactured product and the region of the cutting groove which is outside the manufactured product is taken care of, accordingly the accuracy of detection of the actual positions of the peculiar points by analyzing this image is enhanced.

In a preferred embodiment, said image sensor is arranged at a position which is sufficiently higher than said cutting tool for metallic droplets which jump up from said base material during cutting of said base material, not to come into contact with said image sensor.

In a preferred embodiment, said peculiar point detection means limits the region, within the image of said image capture region which is acquired from said image sensor, over which image analysis for detection of the actual positions of said peculiar points is performed, to only regions in the neighborhoods of said proper positions of said peculiar points. Due to this, the time period for image analysis becomes shorter.

In a preferred embodiment, there are further included a display screen and a peculiar point designation means for the operator to designate a desired position upon an image which is displayed upon said display screen as being each of said peculiar points. And said peculiar point detection means further comprises: a check means which checks whether or not said actual position of said each peculiar point, detected by analysis of said image acquired from said image sensor, satisfies a predetermined erroneous detection condition; a means which, if the result of said check is YES, displays upon said display screen said image which has been acquired by said image sensor; and a means which, if said operator has designated any desired position upon said image which has been displayed upon said display screen using said peculiar point designation means, detects said designated position as being the actual position of said each peculiar point. Due to this, if there is a possibility that the actual position of each of the peculiar points which have been detected by the image analysis is in error, it is possible for the operator to indicate the actual positions of the peculiar points upon the image which is being displayed upon the display screen. In this manner, the manual detection of the peculiar points by the operator is used so as to compensate for the errors in automatic detection by the image analysis, and thereby the reliability of detection of the peculiar points is enhanced. Manual detection of the peculiar points is easy from the point of view of the operator, since it is performed upon the image which is being displayed upon the display screen.

In a preferred embodiment, if there is a possibility that the result of automatic detection of the actual position of the peculiar point by image analysis is in error, it is arranged for it to be possible positively to summon the operator with an alarm sound or the light of a lamp or the like. Due to this, the working efficiency is enhanced.

In a preferred embodiment it is arranged, when performing manual detection of the peculiar points, to magnify the images which have been displayed upon said display screen. Due to this, from the point of view of the operator, the designation of the actual positions of the peculiar points becomes yet easier.

According to another aspect of the present invention, an automatic cutting device includes: a stage for a base material to be placed upon; a cutting tool; an image sensor, having an image capture region, for photographing a photographic region upon said stage; a tool shift mechanism for, with respect to said stage, shifting said cutting tool, and moreover shifting said photographic region of said image sensor; a display screen for displaying an image of said photographic region which is outputted from said image sensor; a reference point designation means for the operator to designate any desired position upon the image displayed upon said display screen as a reference point upon said base material; a shift/stop command input means for said operator to input a shift command for shifting said image capture region of said image sensor, and a stop command for stopping the shifting of said image capture region; and a controller which controls the operation of each of said cutting tool, said image sensor, and said tool shift mechanism. And the controller includes: an image capture region shift control means which, if said operator has inputted said shift command using said shift command input means, performs control so as to shift said image capture region of said input image sensor in response to said shift command which has been inputted; and, if said operator has inputted said stop command using said shift command input means, performs control so as to stop the shifting of said image capture region of said input image sensor in response to said stop command which has been inputted; a display control means which acquires an image of said image capture region from said image sensor, and displays it upon said display screen; and a reference point detection means which, when the shifting of said image capture region of said image sensor is stopped, if said operator has designated, using said reference point designation means, a desired point upon said image of said image capture region which is displayed upon said display screen, detects the coordinates of said designated point as being the coordinates of a reference point upon said base material. Due to this, the workman is able to teach the controller the coordinates of the reference point upon the base material which has been placed upon the table, by shifting the image capture region of the image sensor and setting the image capture region roughly to a position such that the point which corresponds to a reference point upon the base material enters within the image capture region, and, while looking at the image of the above described image capture region which is being displayed upon the display screen, only performing simple actuation to designate the point upon the image which has been displayed which corresponds to the reference point.

And, according to yet another aspect of the present invention, a production method for a beveled product using a single automatic cutting device which operates according to an NC program includes: a step of cutting a base material which has been set upon said automatic cutting device, according to the NC program, and cutting out a manufactured product; a step of, after the cutting out of said manufactured product has been completed, acquiring, using an image sensor, an image of at least a single region which includes the proper positions, defined by said NC program, of at least two peculiar points upon said manufactured product which has been cut out; a step of analyzing said image of said at least a single region which has been acquired by said image sensor, and detecting the actual positions of said at least two peculiar points of said manufactured product which has been cut out; a step of correcting said NC program so as to match it to the actual position of said manufactured product which has been cut out, according to said actual positions of said at least two peculiar points which have been detected; and a step of performing additional cutting upon said manufactured product which has been cut out, according to said corrected NC program.

BRIEF DESCRIPTION OF THE DRAWINGS

FIG. 5 is a figure showing the flow of control of a cutting process for beveling, which consists of a plurality of cutting sub-process stages;

PREFERRED EMBODIMENTS FOR IMPLEMENTATION OF THE INVENTION

In the following, embodiments of the present invention will be explained with reference to the drawings.

Figure 1:
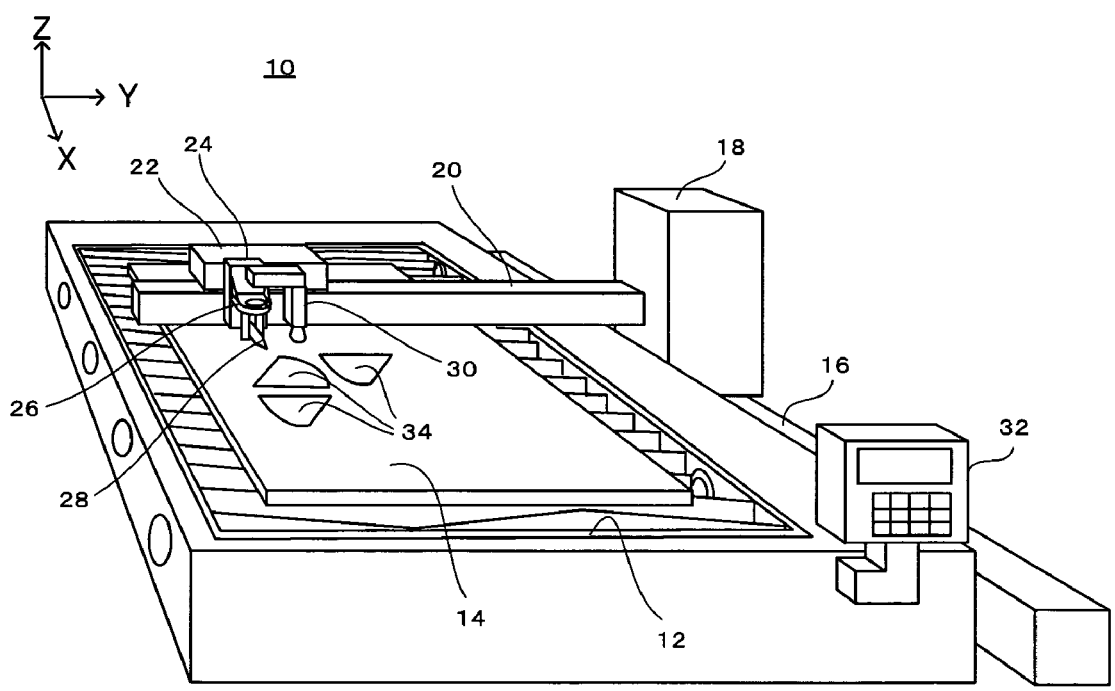
FIG. 1 is a perspective view showing the overall structure of a first embodiment of the present invention, which is applied to a plasma cutting device.

FIG. 1 shows the overall structure of a first embodiment of the present invention, which is applied to a plasma cutting device.

As shown in FIG. 1, the plasma cutting device 10 according to the first embodiment of the present invention comprises a table 12 which is shaped almost as a rectangular parallelepiped and which is mounted upon the floor, and a base material 14 (typically a steel plate) is mounted upon the upper surface of this table 12. In order to control the cutting position with respect to this base material 14, an orthogonal coordinate system is logically defined, having an X axis and a Y axis in the direction of the long side and the short side of the plane shape of the table 12 respectively, and moreover having a Z axis in the direction orthogonal to the upper surface of the table 12 (i.e. in the height direction). An X track 16 which is parallel to the X axis is installed upon the flank of the table 12, and a trolley 18 is carried upon this X track 16, so that the trolley 18 is able to shift to and fro along the X axis direction.

A Y track beam 20 extends from the trolley 18 over the table 12 parallel to the Y axis, and a carriage 22 is fitted upon this Y track beam 20, so that the carriage 22 can shift to and fro along the Y axis direction. An elevator 24 is fitted upon the carriage 22, and a tilter 26 is fitted upon this elevator 24, so that the elevator 24 can shift the tilter 26 to and fro along the Z axis direction. A plasma torch 28 is fitted upon this tilter 26, and constitutes a cutting tool. The tilter 26 is able to tilt the plasma torch 28 (i.e. is able to change the direction of the plasma torch 28) through a predetermined angular range which is required for beveling.

Figure 2:
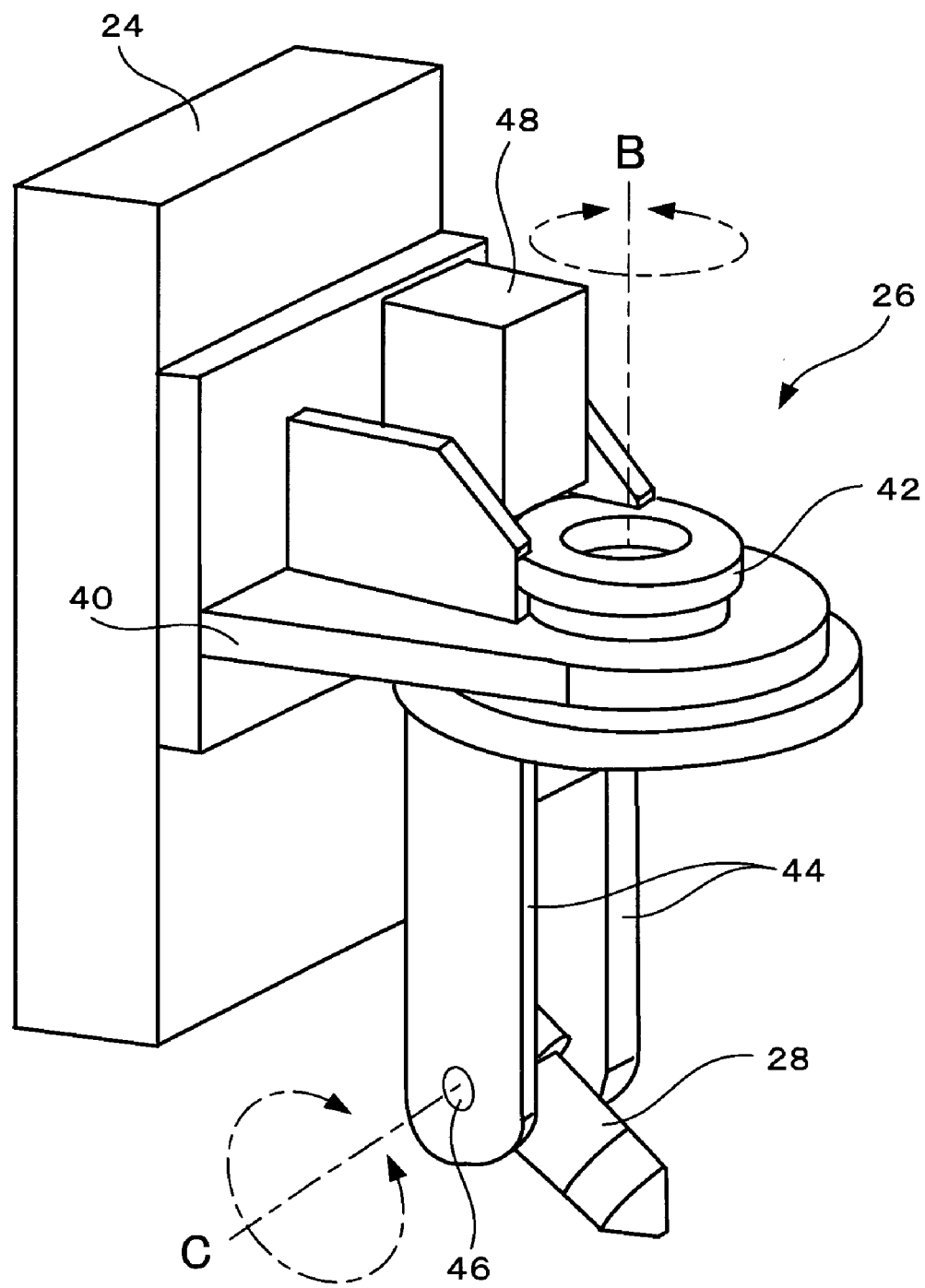
FIG. 2 is a perspective view of a tilter for tilting a plasma torch of the first embodiment.

As shown in FIG. 2, the tilter 26 has a bracket 40 fitted to the elevator 24 which can be raised and lowered in the Z axis direction, and a main rotation shaft 42 is fitted to this bracket 40 so as to extend parallel to the Z axis, with this main rotation shaft 42 being free to rotate through a fixed angular range around an axis B which is parallel to the Z axis. Moreover, two arms 44, 44 are fixed to the main rotation shaft 42 so as to extend downwards parallel to the Z axis, and the plasma torch 28 is fixed to the lower end portions of these arms 44, 44 via a secondary rotation shaft 46, so that the plasma torch 28 is free to rotate with respect to the arms 44, 44 through a fixed angular range around an axis C which is perpendicular to the axis B. By power from a motor unit 48 which is fitted to the bracket 40, rotation of the main rotation shaft 42 and rotation of the secondary rotation shaft 46 may be performed independently.

Referring again to FIG. 1, an image sensor 30 for sensing a two dimensional image of the surface of the base material 14 upon the stage 12 is also fitted to the elevator 24, and this image sensor 30 can be raised or lowered along the Z axis direction together with the tilter 26 (and the plasma torch 28). While various types of construction may be employed for this image sensor 30, such as, for example, an image sensor which incorporates an area image sensor using a CCD or the like (i.e. a still camera or a video camera), or one which is built to scan a range for photography with a linear image sensor such as one used in a flat base type image scanner or the like, or one which performs photography of an image with infrared rays, or the like, in this embodiment, as one example, a digital video camera which uses a CCD or the like is used. It should be understood that it would also be acceptable for the image sensor 30 not to be fitted to the elevator 24, but to the carriage 22. In any case, the image sensor 30 can be shifted together with the tilter 26 (and the plasma torch 28) in the X axis direction and in the Y axis direction, and the positional relationship in the X-Y plane between the image sensor 30 and the tilter 26 (i.e. the position in which the plasma torque is basically fitted) is fixed. The field of view of the image sensor 30 is towards the table 12 (i.e. downwards) parallel to the Z axis, and the imaging optical system of the image sensor 30 is adjusted so that it can form an image of the main surface (i.e. of the upper surface) of the base material 14 upon the table 12 upon the light reception surface of the image sensor 30; and, accordingly, it is able to perform photography of a region of some particular size on the main surface of the base material 14 (hereinafter this is termed the "image capture region").

The X track 16, the trolley 18, the Y track beam, the carriage 22, the elevator 24 and the tilter 26 together constitute a tool shift mechanism for changing the cutting position (in other words the position of the point of cutting the base material 14 upon the X-Y coordinate plane) and the cutting angle (the bevel angle, in other words the angle of the cut surface with respect to the Z axis) by the plasma torch 28 with respect to the base material 14 upon the stage 12. This tool shift mechanism 16 through 26 also fulfills the role of changing the position of the image capture region of the image sensor 30 with respect to the base material 14 upon the stage 12. Although this feature is not shown in FIG. 1, this plasma cutting device 10 is also provided with a plasma power supply 35 (refer to FIG. 3) for supplying electrical power to the plasma torch 28, and with a gas system 36 (refer to FIG. 3) for supplying plasma gas and assist gas to the plasma torch 28.

Figure 3:
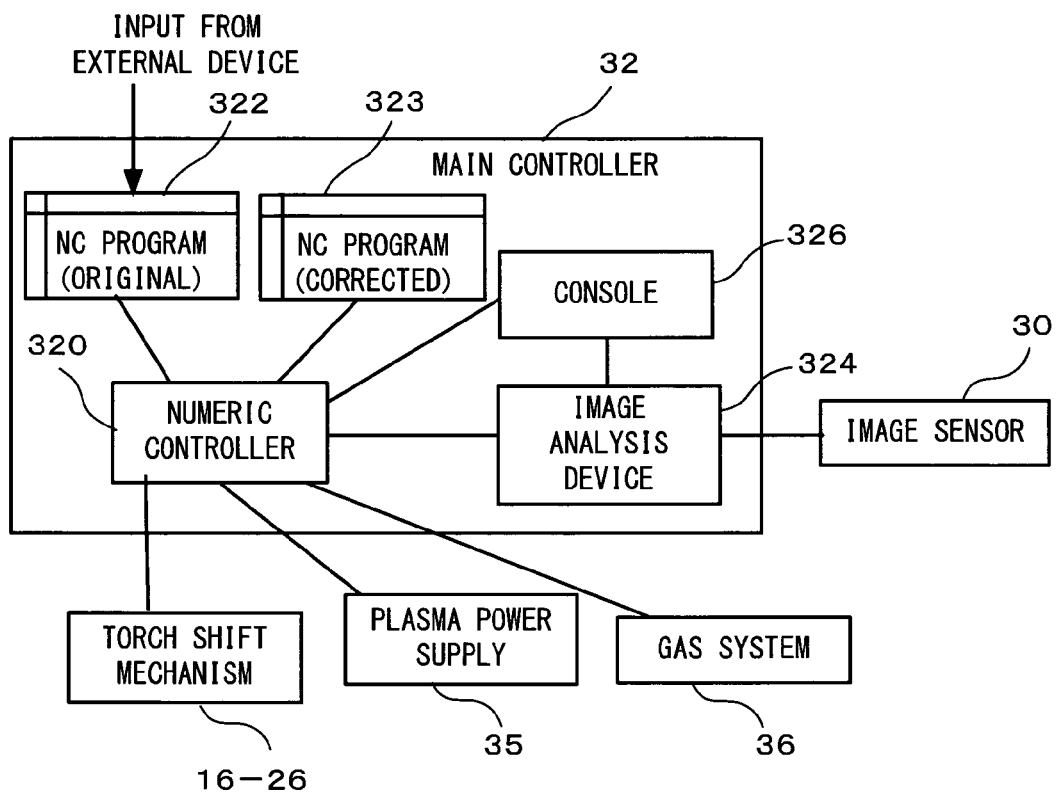
FIG. 3 is a block diagram showing the calibration of a main controller 32 of the first embodiment.

A main controller 32 is installed close to the table 12. As shown in FIG. 3, this main controller 32 includes a numeric controller 320, and this numeric controller 320 inputs an NC program 322 from an external device and stores it, and controls execution of a cutting process for cutting out a manufactured product 34 from the base material 14 based upon this NC program 322. In other words, based upon this NC program 322 which it has stored, the numeric controller 320 controls the operation of the plasma power supply 35 and the operation of the gas system 36, and controls the operation of the plasma torch 28, while controlling the operation of the tool shift mechanism 16 through 26 and controlling the shifting and the angle (the bevel angle) of the plasma torch 28. Here in this NC program 322 there is included, for example, base material definition data which defines the shape and the size and so on of the base material 14, and manufactured product drawing data which defines the position and the shape of the manufactured products 34 upon the base material 14. Furthermore, when it is necessary to perform beveling upon the manufactured products 34, beveling data is also included in the NC program 322 which specifies detailed conditions for beveling, such as upon which portions and where upon the manufactured products 34 beveling is to be performed, and what cross sectional shape the cut surface which has been beveled should have, and the like. Moreover, if the beveling of the manufactured products 34 includes a plurality of cutting sub-process stages as will be described hereinafter, then the X and Y coordinate values of the positions of at least two points (termed "peculiar points") upon the external outline of each manufactured product (typically, for example, these are points which correspond to corners of the external shapes of the manufactured products 34), which have been selected in advance according to the shape of each manufactured product 34, are also included in the NC program 322.

As will be explained subsequently with reference to FIGS. 4A through 4D, a number of types of beveling may be implemented by two or more cutting sub-process steps. In this case, in a first cutting sub-process stage, the manufactured products 34 are cut out from the base material 14 based upon the NC program 322. Thereafter, in second and subsequent cutting sub-process stages, additional cutting is performed upon the manufactured products 34 which have been cut out, based upon the NC program 322, so that their cut surfaces have, with regard to their cross sectional shapes, the shapes specified by the beveling data in the NC program 322. If a plurality of cutting sub-process stages are performed in this manner, when the manufactured products have been cut out from the base material 14 during a first cutting sub-process stage, sometimes it is the case that the position of each of the manufactured products 34 slightly deviates from its original position (i.e. from its proper position), which is undesirable. And positional deviation of the manufactured products 34 sometimes also occurs in the second cutting sub-process stages as well. If the position of some manufactured product 34 has deviated from its proper position in the previous cutting sub-process, then it becomes impossible to perform the subsequent cutting sub-process based upon the original NC program 322. To defend against this problem, directly before starting each of the cutting sub-process stages from the second and subsequently, the main controller 32 is adapted so as to be further capable of performing control so as to detect the above described positional deviations of the manufactured products 34, and so as to correct the NC program 322 in order to compensate for these positional deviations.

In order to enable this corrected control by the NC program 322, as shown in FIG. 3, the main controller 32 comprises an image analysis device 324, and this image analysis device 324 is connected to the numeric controller 320 and to the image sensor 30. The image analysis device 324 could be a computer program, or could be a hard wired logic circuit; and it could also be a combination of these. The image analysis device 324 and the numeric controller 320 implement the control described above by cooperating in the following manner. That is, directly before starting the second and each subsequent cutting sub-process stage, the numeric controller 320 shifts the image sensor 30 by controlling the tool shift mechanism 16 through 26, and causes the image sensor 30 to stop sequentially at two positions such that the center point of the image capture region of the image sensor 30 coincides with the proper positions of at least two peculiar points (positions at which the peculiar points would actually be positioned if the positional deviations described above were not present) of each manufactured product 34 which have been designated by the NC program 322 (in other words at positions directly above the proper positions of these two peculiar points). When the image sensor 30 is stopped directly above the proper position of each peculiar point, the image analysis device 324 drives the image sensor 30 and acquires an image of the image capture region (i.e. of a region of a predetermined size centered upon the proper position of each peculiar point) upon the main surface of the base material 14, analyzes this image which has been acquired, and calculates the X and Y coordinates of the actual position of each of the peculiar points by detecting these X and Y coordinates. And the image analysis device 324 informs the numeric controller 320 of the X and Y coordinate values of the actual positions of the peculiar points which it has thus detected. For each one of the manufactured products 34, the X and Y coordinate values of the actual positions of at least two peculiar points are detected by the image analysis device 324, and are informed to the numeric controller 320. Thereafter, the numeric controller 320 compares together the X and Y coordinate values of the actual positions of the at least two peculiar points upon each of the manufactured products 34 which have been notified from the image analysis device 324, and the X and Y coordinate values of the proper positions of the above described peculiar points upon each of the manufactured products 34 which have been specified by the NC program 322, and thereby calculates a set of values which specify the amount of positional deviation of the actual position of each of the manufactured products 34 from its proper position (i.e. a set consisting of translational component values and a rotational component value). And the numeric controller 320 corrects the NC program 322 (in particular the manufactured product drawing data for each of the manufactured products 34) so that it matches the actual position of each of the manufactured products 34 according to this set of values of positional deviation which have been calculated, and controls the next cutting sub-process stage based upon this corrected NC program 323. As will be understood from the detailed explanation of this control which will be described hereinafter, according to this control, it is possible to ascertain the actual positions of the manufactured products 34 in a simpler manner than with the prior art techniques previously described. Moreover, this control can be performed even without removing from the table 12 the scrap (the left over material other than the manufactured products 34).

As shown in FIG. 3, the main controller 32 also comprises a console 326. This console 326 is used for the operator of the above described numeric controller 320 and image analysis device 324 to input various commands, and to display various types of information from the numeric controller 320 and the image analysis device 324 (for example, images received from the image sensor 30, the proper positions of the peculiar points described above and their actual positions, various types of character message, and so on) and the like.

FIGS. 4A through 4D show examples of cross sectional shapes of cut surfaces of manufactured products 34, according to a plurality of types of beveling which are representative of beveling which can be executed by this plasma cutting device 10 according to this embodiment of the present invention.

Figure 4A:
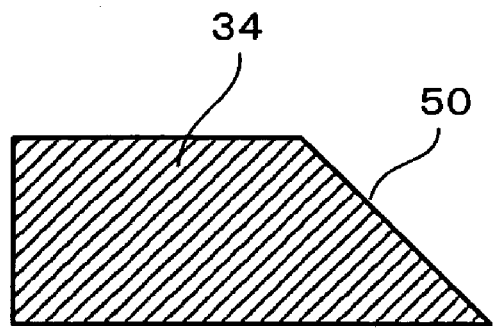
FIGS. 4A through 4D are sectional views of cut surfaces, for explanation of different types of beveling.

According to the type of beveling shown in FIG. 4A, the entirety of the cut surface of the manufactured product 34 is a beveled surface 50 which subtends some angle other than the perpendicular with respect to the main surface of the manufactured product 34 (i.e. its upper surface). This type of beveling in which the entirety of the cut surface constitutes one beveled surface 50 is generally termed "V beveling". It should be understood that the case in which FIG. 4A is reversed top to bottom is also included within "V beveling".

Figure 4B:
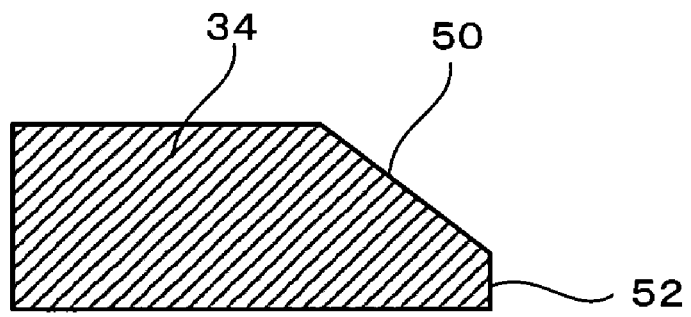

According to the type of beveling shown in FIG. 4B, a portion of the cut surface of the manufactured product 34 is a beveled surface 50, while its remaining portion is a perpendicular surface 52 which is perpendicular to the main surface of the manufactured product 34. This type of beveling in which, in this manner, the cut surface consists of two surfaces, i.e. the beveled surface 50 and the perpendicular surface 52, is generally termed "Y beveling". It should be understood that the case in which FIG. 4B is reversed top to bottom is also included within "Y beveling".

Figure 4C:
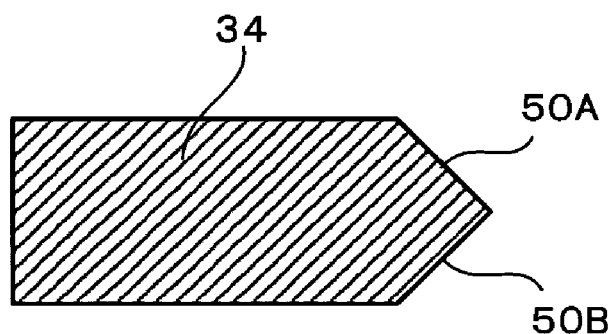

According to the type of beveling shown in FIG. 4C, the cut surface of the manufactured product 34 consists of one beveled surface 50A which has a positive bevel angle, and one beveled surface 50B which has a negative bevel angle. This type of beveling in which the cut surface consists of the two beveled surfaces 50A and 50B which have different beveled angles is generally termed "X beveling".

Figure 4D:
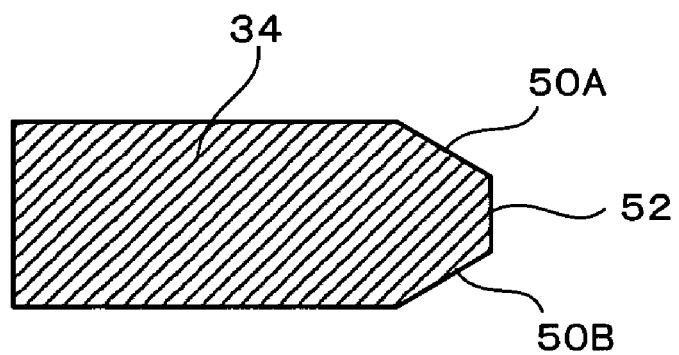

And, according to the type of beveling shown in FIG. 4D, the cut surface of the manufactured product 34 has upper and lower beveled surfaces 50A and 50B and a central perpendicular surface 52. This type of beveling in which the cut surface consists of the three beveled surfaces 50A, 50B, and 52 which have different beveled angles is generally termed "K beveling".

The V beveling shown in FIG. 4A can be performed with one cutting process stage. By contras, the Y beveling and the X beveling shown in FIGS. 4B and 4C both need two cutting sub-process stages, whereas the K beveling shown in FIG. 4D needs three cutting sub-process stages. Such Y, X, and K beveling is thus controlled according to the theory of the present invention. Here, in Y, X, and K beveling, the formation of the perpendicular surface and the beveled surface(s) may be freely selected to be at any stage. For example, in the case of the Y beveling shown in FIG. 4B, typically, the perpendicular surface 52 is formed at the first stage, and then the beveled surface 50 is formed at the second stage; but, conversely, it would also be acceptable to arrange to form the beveled surface 50 at the first stage, and to form the perpendicular surface 52 at the second stage.

FIG. 5 shows this flow of control when the main controller 32 (the numeric controller 320 and the image analysis device 324) control a cutting process for beveling which consists of a plurality of cutting sub-process stages.

As shown in FIG. 5, in a step 60, the numeric controller 320 within the main controller 32 controls the execution of a first cutting sub-process stage based upon the NC program which has been inputted. In this first cutting sub-process stage, based upon the position and orientation of the base material upon the stage 12 which is determined in advance, and upon the shape drawing data for the manufactured products 34 which is described in the NC program 322, the plasma torch 28 injects a plasma arc while shifting along a drawing of the shapes of the manufactured products 34 while maintaining a first bevel angle, and thereby the manufactured products 34 are cut out from the base material 14 by the base material 14 being cut at the first bevel angle (for example, at an angle which is perpendicular with respect to the main surface of the base material 14, or at an angle which is inclined at a predetermined inclination thereto) around the entire outlines of the manufactured products 34. Since the manufactured products 34 which have thus been cut out are perfectly cut out and separated from the base material 14, accordingly it sometimes happens that the position of each of these manufactured products 34 sometimes deviates slightly from its proper position, which is undesirable. When all of the manufactured products 34 specified by the NC program 322 are cut out, the first cutting sub-process stage is completed.

Figure 6:
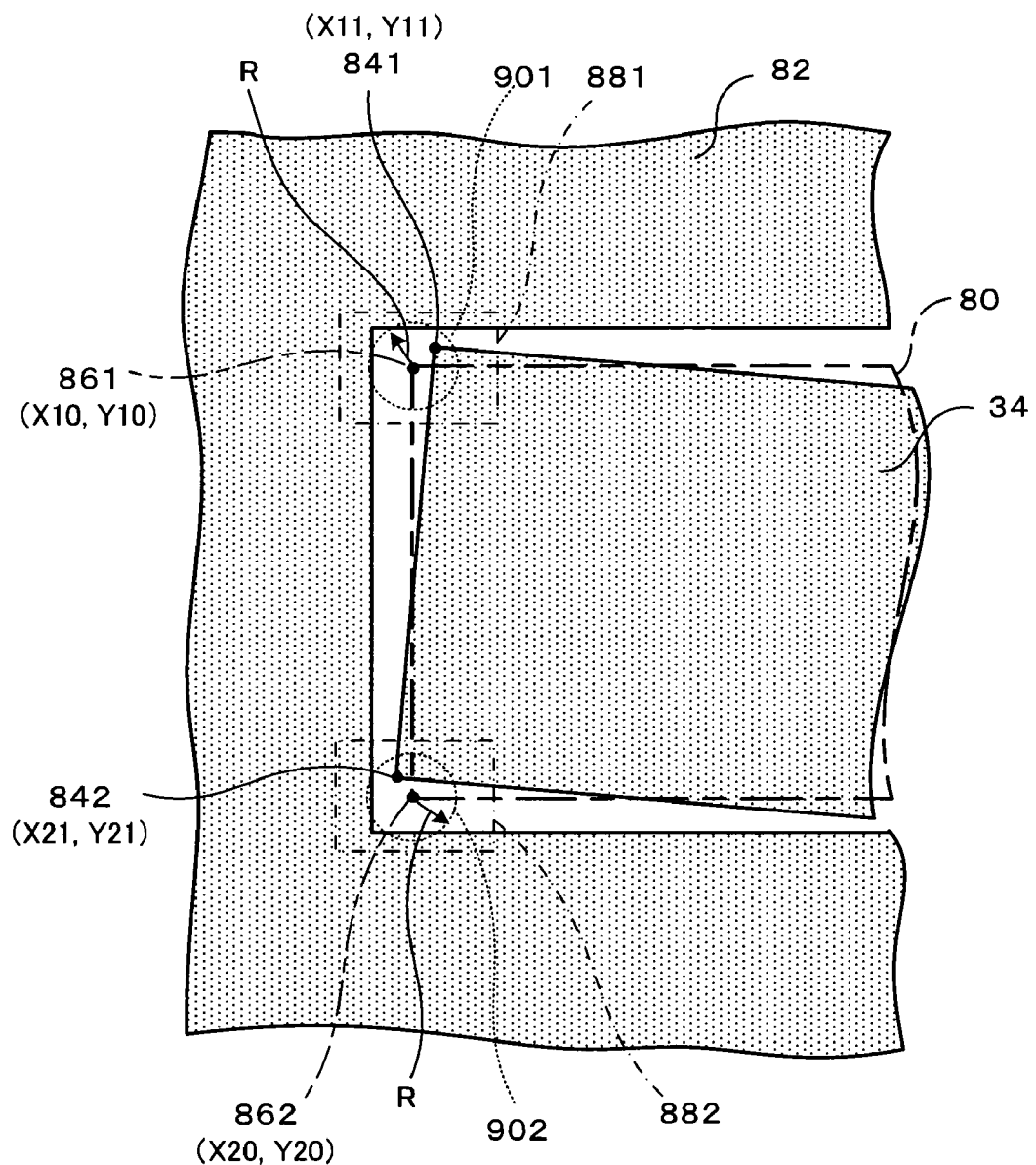
FIG. 6 is a plan view of a manufactured product 34 which has been cut out, for explaining control to detect the position of this manufactured product 34 and to ascertain its positional deviation.

After the first cutting sub-process stage has been completed, the main controller 32 performs the control of the steps 62 through 66, in other words performs control to detect the actual positions of the manufactured products 34 which have been cut out, and to ascertain the positional deviation of each of the manufactured products 34. FIG. 6 is a plan view of one of the manufactured products for explanation of this control in concrete terms. In the following, the control of the steps 62 through 66 will be explained with reference to FIGS. 5 and 6.

As shown in FIG. 5, in the step 62, the image analysis device 324: drives the image sensor 30; photographs, upon each of the manufactured products 34 which has been cut out, at least two regions upon the surface of the base material 14 of a predetermined size, each of these two regions being centered at the proper position of a peculiar point upon that manufactured product 34; acquires from the image sensor 30 these images of the two regions which have been photographed; and converts these images of the two regions (color images or gray scale images) to binary images (monochrome images). Here, the peculiar points of the manufactured products 34 are some spots or points upon the manufactured products 34 which are suitable for indexing of the positions of the manufactured products 34 to be performed based upon their positions. Since it is necessary to ascertain the positional deviations (the translational component and the rotational component) of each of the manufactured products 34, accordingly at least two peculiar points are set for each of the manufactured products 34. The X and Y coordinates of the at least two peculiar points upon each of the manufactured products 34 are set beforehand by the NC program 322. Or, as a variant example, it would also be acceptable for the numeric controller 32 to determine the X and Y coordinates of the proper positions of at least two peculiar points upon each of the manufactured products 34, based upon the manufactured product drawing data for each of the manufactured products which is included in the NC program 322. In this embodiment, two corner points upon the external outline of each of the manufactured products 34 are used as the two peculiar points. Furthermore, the "proper positions" of the peculiar points are the positions at which the peculiar points should actually be located if positional deviation of the manufactured products 34 had not occurred, and these are determined based upon the manufactured product drawing data within the NC program 322 for each of the manufactured products 34. Thus, due to the positional deviations of the manufactured products 34 which have occurred, the actual positions of the peculiar points undesirably are deviated from their proper positions.

This step 62 will now be explained using the example shown in FIG. 6. In FIG. 6, the drawing by the single dashed broken line to which the reference numeral 80 is affixed is defined by the manufactured product drawing data of the NC program 322 and is the drawing of the shape of some one of the manufactured products 34, and defines the proper position of this manufactured product 34; this will hereinafter be termed the "proper manufactured product drawing". The two corner points 861 and 862 upon the external outline of this proper manufactured product drawing 80 are set as the peculiar points of this proper manufactured product drawing 80. Since these peculiar points 861 and 862 of the proper manufactured product drawing 80 correspond to the proper positions of these two peculiar points of the manufactured product 34 (i.e. to its corner points), accordingly these will hereinafter be termed the "peculiar point proper positions". In the step 62, the numeric controller 320 shifts the image sensor 30 along the X axis and the Y axis, and sets the position of the image sensor 30 so that the center of the image capture region of the image sensor 30 is positioned at the proper position 861 of the first peculiar point. And the image analysis device 324 drives the image sensor 30 and acquires an image of this image capture region 881 (in other words, an image of a region of the predetermined size which is centered upon the first peculiar point proper position 861). Next, the numeric controller 320 sets the position of the image sensor 30 so that the center of the image capture region of the image sensor 30 is positioned at the proper position 862 of the second peculiar point, and the image analysis device 324 drives the image sensor 30 and acquires an image of this image capture region 882 (in other words, an image of a region of the predetermined size which is centered upon the second peculiar point proper position 862). Here, since the X and Y coordinates of the proper positions 861 and 862 of the peculiar points are determined based upon the NC program 322, accordingly the control for setting the positions of the center of the image capture region of the image sensor 30 to the proper positions 861 and 862 of the peculiar points respectively as described above, is performed based upon the NC program 322. When the image sensor is photographing the image capture regions 881 and 882, along with the manufactured products 34, it is also acceptable for the scrap 82 to remain upon the stage 12, in the same position as its position when the first cutting sub-process stage ended. Of course, before this photography is performed, it would also be acceptable to arrange to remove the scrap 82 from upon the stage 12, thus leaving only the manufactured products 34 behind.

In many cases, as shown in the figure, the actual position of the manufactured product 34 which has been cut out deviates slightly from the drawing 80 of the proper manufactured product, and accordingly the actual positions 841 and 842 of the two peculiar points upon the manufactured product 34 deviate from the corresponding proper positions 861 and 861 of these peculiar points. In almost all cases, this positional deviation distance is around 1 mm at the very most. The size of the image capture regions 881 and 882 is set to be sufficiently greater than the above described amount of positional deviation. Accordingly, the actual positions 841 and 842 of the peculiar points necessarily fall within these image capture regions 881 and 882.

Referring to FIG. 5 again, after having acquired, in the step 62 described above, the binary images of the image capture regions 881 and 882, in a step 63, the image analysis device 324 analyzes these binary images of the image capture regions 881 and 882 and finds the actual positions 841 and 842 of their two peculiar points, and calculates the X and Y coordinates of these actual positions 841 and 842. It would be acceptable for the ranges over which the actual positions 841 and 842 of the peculiar point are sought to be the entire ranges of the image capture regions 881 and 882; or it would also be acceptable not to do this, but, as in the example shown in FIG. 6, to arrange to limit these searches to within neighborhood ranges 901 and 902 within a predetermined distance from the respective proper positions 861 and 862 of these peculiar points. Here, a value approximately equal to the maximum possible value of the positional deviation distance (for example the maximum width of the cutting groove, in other words of the gaps between the manufactured products 34 which have been cut out and the scrap 82) may be employed for this predetermined distance R. By limiting the range in which the actual positions 841 and 842 of the peculiar points are sought to within the neighborhood ranges 901 and 902 of the proper positions 861 and 862 of the peculiar points, the possibility is reduced of mistakenly detecting some spot upon the scrap 82 as a peculiar point (which would be undesirable), since it is often the case that the scrap 82 which is present around the manufactured products 34 is eliminated from the search range. Moreover, by this type of search, if a plurality of candidate points have been found for which the possibility of corresponding to the same peculiar point is of the same height, then it is possible to select, from among this plurality of candidate points which have been found, the one point which lies in the closest position to the proper position of the corresponding peculiar point, as being the actual position of that peculiar point. And, as a variant example, it would also be acceptable to arrange, not as described above to acquire images of the two regions 881 and 882 which include the proper positions 861 and 862 of the two peculiar points respectively and to analyze these images, but rather to acquire in one operation the image of a single broad region which includes both of the proper positions 861 and 862 of the two peculiar points, and to analyze this image of this single board region, thus finding the actual positions 841 and 842 of the two peculiar points.

Various different methods may be employed as methods for analysis of the image for finding the actual position of the peculiar points. For example, it is possible to employ a method in which, from within the images of the image capture regions 881 and 882, a plurality of line segments are detected which make up the external outline of the manufactured products 34, and the corner points which are formed by the intersections of those line segments and which are closest to the proper positions 861 and 862 of the peculiar points are extracted and are considered as being the actual positions of the peculiar points. Or it would also be possible to employ a method of pattern matching, as shown by way of example in FIGS. 7A and 7B. This method is a method of extracting, from within the images of the regions 881 and 882, drawing patterns which best match the patterns of the shapes of the manufactured products in the neighborhood of the peculiar points, as determined from the manufactured product drawing.

Figure 7A:
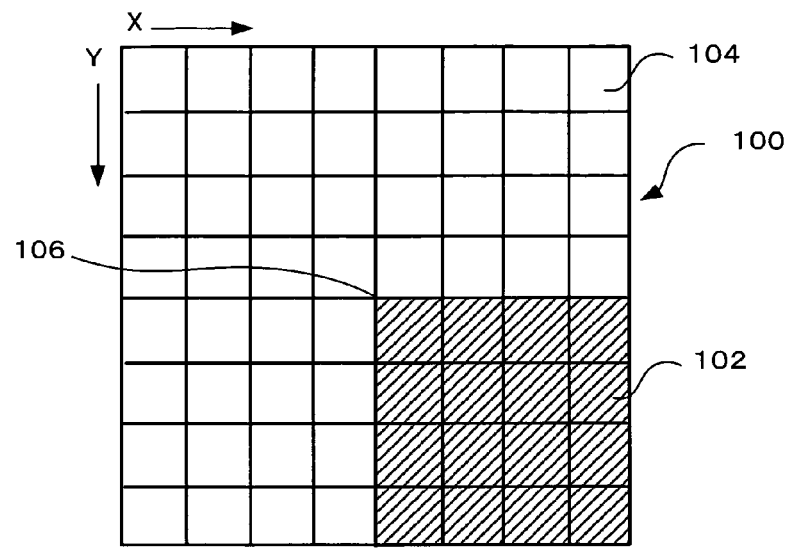
FIG. 7A is a figure showing an example of a pattern for searching for a peculiar point by a method of pattern matching.
Figure 7B:
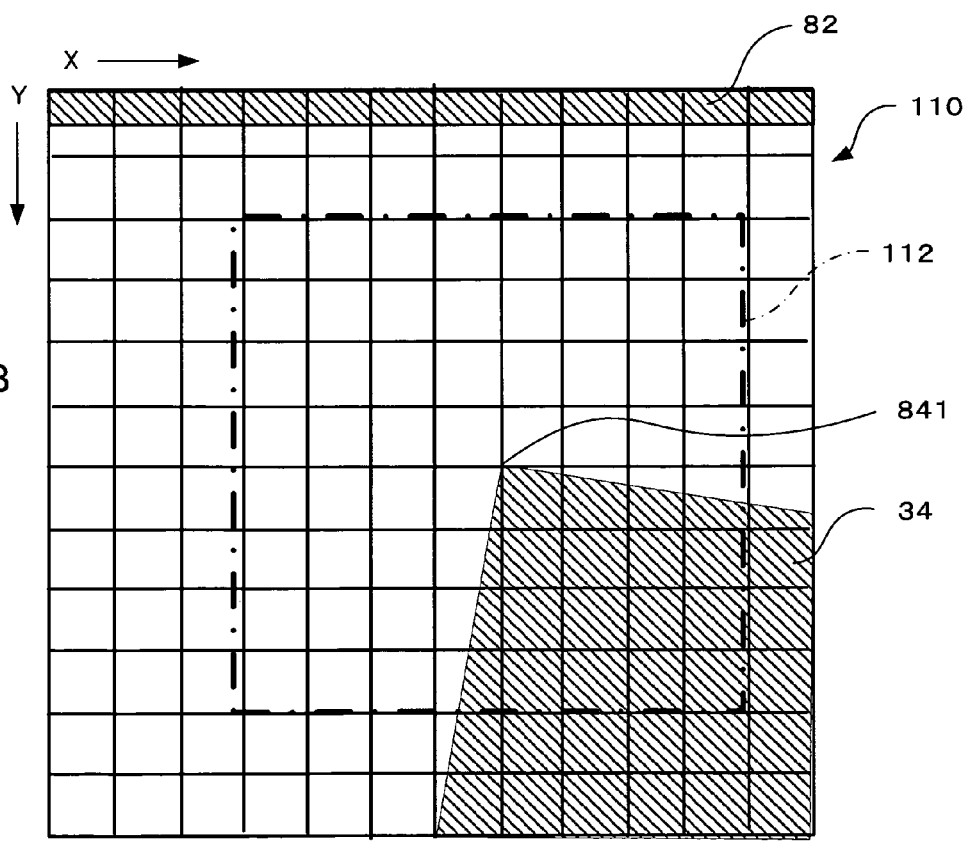
FIG. 7B is a figure showing an example when a match between a drawing of the manufactured product within an image and the pattern has been found.

In FIG. 7A, there is shown a picture element value matrix 100 which is used in this pattern matching method. This picture element value matrix 100 has a size of M picture elements by N picture elements (in FIG. 7A, one square corresponds to one picture element, and accordingly, in the example shown in this figure, the size of the picture element value matrix 100 is 8 picture elements×8 picture elements). Each of the picture element values within this picture element value matrix 100 is a binary value of either "1" or "0". The picture element value matrix 100 consists of a manufactured product region 102 and a background region 104, and all of the picture element values in the manufactured product region 102 are, for example "1", while all of the picture element values in the background product region 104 are, for example, "0". The shape of the manufactured product region 102 corresponds to the shape of the portion in the manufactured product drawing in the neighborhood of the proper position 861 of a peculiar point of some manufactured product 34 which is defined by the manufactured product drawing data of the NC program, while the shape of the background region 104 corresponds to the shape of the region outside this manufactured product drawing (typically, a region which is to be cut away). And the single corner point 106 which corresponds to the proper position 861 of the peculiar point of this manufactured product region 102 is positioned at the center point of this picture element value matrix 100.

The image analysis unit 324 receives the manufactured product drawing data of the NC program from the numeric controller 320 and, based upon this manufactured product drawing data, creates the picture element value matrix 100 having the above described structure to correspond to the proper position of some peculiar point of the manufactured products 34, for example the proper position 861 of a first peculiar point. And thereafter the image analysis device 324 overlays the picture element value matrix 100 upon a single portion within the binary image of the photographed region 881 of the proper position 861 of this first peculiar point. At this time, first, the picture element value matrix 100 is overlaid while making the center point of this binary image (in other words, the proper position 861 of the first peculiar point) and the center point of the picture element value matrix 100 (in other words, the corner point 106 of the manufactured product region 102 shown in FIG. 7A) positionally agree with one another. And the image analysis device 324 compares together the picture element values of the picture elements within the picture element value matrix 100 and the picture element values of the picture elements within the binary image which has been laid thereover, investigates whether or not the picture element values of these two agree with one another, and totals the number of picture elements for which agreement of the picture element values has been obtained. This total value indicates the degree of matching of image patterns between the picture element value matrix 100 and the portion of the binary image over which it has been overlaid. Thereafter, the image analysis unit 324 sequentially shifts the position of the center point of the picture element value matrix 100 upon the binary image one picture element at a time in the X direction or the Y direction, performs the comparison of the picture element values described above in each position to which this shifting has been performed, and determines the degree of matching by totaling the number of picture elements for which the picture element values agree with one another. The shifting of the center point of the picture element value matrix 100 is repeated over all of the picture element positions of the search range described above, and the number of picture elements for which the picture element values agree with one another, in other words the degree of matching, is calculated at each position to which shifting has been performed.

As the result of the above, that position, among the various positions within the binary image at which the center point of the picture element value matrix 100 has been placed, for which the number of picture elements whose picture element values agree, in other words the degree of matching, is the greatest, is decided to be the position for which the possibility of correspondence to the actual position 841 of the first peculiar point is the highest, and the X and Y coordinates of this position are detected as being the actual position 841 of the first peculiar point. For example, as shown by way of example in FIG. 7B, when the picture element value matrix shown in FIG. 7A is overlaid upon the region 112 shown by the single dotted broken line in the binary image 110, then the degree of matching is maximum. Accordingly, the position 841 within the binary image 110 which corresponds to the center point of the picture element value matrix 100 at this time (in other words to the corner point 106 of the manufactured product region 102 shown in FIG. 7A) is detected as being the actual position of the first peculiar point. The same type of pattern matching as the above is also performed for the second peculiar point of each of the manufactured products 34, and thus the actual position 842 of the second peculiar point shown in FIG. 6 is also detected.

It should be understood that, as a method for calculating the degree of matching, instead of this method of simply counting the number of picture elements for which the picture element values agree with one another, a method may also be employed in which large weighting coefficients are allocated to picture elements which are close to the center point of the picture element value matrix 100 (in other words, to the corner point 106 which corresponds to the peculiar point 841) and small weighting coefficients are allocated to picture elements which are remote from that center point, and the weighting coefficients of the picture elements whose picture element values agree with one another are integrated, with the result being taken as being the degree of matching. With this methods the danger of mistakenly and undesirably detecting the peculiar point as being upon the scrap 82 is reduced yet further.

Referring again to FIG. 5, in the step 63, although the X and Y coordinates of the actual positions 841 and 842 of the two peculiar points of each of the manufactured products 34 have been detected by the above described type of image analysis, these X and Y coordinates which have been detected are X and Y coordinates according to coordinate systems within the respective image capture regions (hereinafter these are termed "image coordinates"). Thus, next, the image analysis device 324 converts the image coordinates of the actual positions 841 and 842 of the two peculiar points which have been obtained by image analysis into corresponding X and Y coordinates (hereinafter termed "machine coordinates") according to a machine coordinate system which is used by the numeric controller 320 for positionally controlling the plasma torch 28. And the image analysis device 324 notifies these machine coordinates 841 and 842 of the two peculiar points to the numeric controller 320.

Thereafter, in the step 64 shown in FIG. 5, based upon the machine coordinates of the actual positions 841 and 842 of the two peculiar points upon each of the manufactured products 34 which have been notified from the image analysis device 324, the numeric controller 320 calculates a set of values (a translation distance value and a rotational angle value) which specify the amount of positional deviation of each of the manufactured products 34. And, based upon this set of values for the amounts of positional deviation of the manufactured products 34, the numeric controller 320 decides whether or not this amount of positional deviation is within a predetermined permitted range. If, as a result, the amount of positional deviation of each of the manufactured products 34 is within the permitted range, then the flow of control proceeds to the step 66, whereas if the amount of positional deviation exceeds the permitted range, then the flow of control proceeds to the step 65. In the step 65 the numeric controller 320 outputs, for example to the console 326, an alarm signal which shows that the amount of positional deviation of this one of the manufactured products 34 exceeds the permitted range, so that this one of the manufactured products 34 is excluded from being the subject of automatic processing by the cutting sub-processes of the next stage and subsequently.

On the other hand, if the result of the step 64 is that the amount of positional deviation of the manufactured product 34 is within the permitted range, then the flow of control proceeds to a step 66, and here the numeric controller 320 corrects the NC program 322 (in particular, the manufactured product drawing data in which the position and the shape of each of the manufactured products 34 are defined) so that it matches the amount of positional deviation of each of the manufactured products 34. Referring again to FIG. 6, in this control process, translation and rotation conversion are performed upon the original NC program 322, so that the machine coordinates (X10, Y10) and (X20, Y20) of the proper positions 861 and 862 of the peculiar points of each of the manufactured products 34, which have been obtained based upon the original NC program 322, are shifted to the machine coordinates (X11, Y11) and (X21, Y21) of the actual positions 841 and 842 of the peculiar points which have been detected. In other words, a translation distance and a rotational angle are calculated for shifting the machine coordinates (X10, Y10) and (X20, Y20) of the proper positions 861 and 862 of the peculiar points of each of the manufactured products 34 to the machine coordinates (X11, Y11) and (X21, Y21) of the actual positions 841 and 842 of the peculiar points of each of the manufactured products 34 which have been detected, and a corrected NC program 323 is obtained by a translation correction to the amount of this translation distance and a coordinate rotation correction to the amount of this rotational angle being applied to the manufactured product drawing data in the original NC program 322 for each of the manufactured products 34. As shown in FIG. 3, this NC program which has thus been corrected is stored in the numeric controller 320.

Referring again to FIG. 5, in a step S68, using the corrected NC program 323, the numeric controller 320 executes the second cutting sub-process stage upon each of the manufactured products 34 which requires beveling—in other words, it performs additional cutting at a second bevel angle (for example, at inclined angles or perpendicular angles with respect to the main surfaces of the manufactured products 34) upon the outer peripheral edge portion of each of the manufactured products 34, and forms the cross sectional shapes of these cut surfaces into the beveled shapes which have been specified by the corrected NC program 323 (for example, into the Y beveled cross sectional shape shown in the example of FIG. 4B, or into the X beveled cross sectional shape shown in the example of FIG. 4C). Since the manufactured product drawing data for each of the manufactured products 34 in the corrected NC program 323 specifies the actual position of each of the manufactured products 34, accordingly the cutting path in this second cutting sub-process stage is controlled to an appropriate position which corresponds to the actual positions of the manufactured products 34, and therefore the processing is performed at high accuracy.

Thereafter, in a step 70, the numeric controller 320 decides whether or not all of the cutting sub-processes which are to be executed have been completed for all of the manufactured products 34, and, if the result is that some beveling which requires the next cutting sub-process stage remains, then the control of the steps 62 through 68 described above is repeated for this beveling, and the next cutting sub-process stage is executed.

Thereafter, by the control of the step 72, the main controller 32 repeats the control of the steps 60 through 70 described above for all of the manufactured products 34 which are defined by the NC program 322.

By the control explained above, with only a single plasma cutting device 10, it is possible efficiently to execute sequentially in an automatic manner a plurality of cutting sub-process stages for beveling, i.e. cutting out the manufactured products 34 from the base material 14, and thereafter performing additional cutting processes upon the cut surfaces of the manufactured products which have been cut out. It should be understood that, during "cutting out" of the manufactured products in the first cutting sub-process, the control which has been explained above can be applied, not only to the case in which cutting is performed perfectly around the entire outer circumferences of the manufactured products and the manufactured products are perfectly separated from the base material (i.e. from the scrap), but can also be applied to the case of leaving only certain portions of the outer circumferences of the manufactured products, so that these portions connect together the manufactured products and the base material (i.e. the scrap) like micro-joints; and, by doing this, it is possible to enhance the processing accuracy of the second and subsequent cutting sub-processes.

Now, in the control described above, it is necessary for the positional relationship between the plasma torch 28 (i.e. the position at which cutting by the plasma torch 28 is performed) and the image sensor 30 to be accurately ascertained by the numeric controller 320 and the image analysis device 322. However, since the plasma torch 28 has not only the X, Y, and Z position control axes but also the axes B and C for tilting, accordingly, if the plasma torch 28 has touched some other object, there is a possibility that the origin of one or another of these axes may slightly deviate from its correct position, which is undesirable. Or, it may happen that, due to some cause, the position of the image sensor 30 may undesirably deviate from its correct position. Thus, in this embodiment, the main controller 32 is further endowed with the functions of detecting the positional relationship between the plasma torch 28 (the position of cutting by the plasma torch 28) and the image sensor 30, and of calibrating the NC program 322 or other process control data according to the positional relationship which it has detected. This calibration may be performed at any desired time, such as when the plasma torch 28 contacts some other object, before the start of beveling, when the power supply to the plasma cutting device is turned on, when an earthquake has occurred, or the like.

Figure 8:
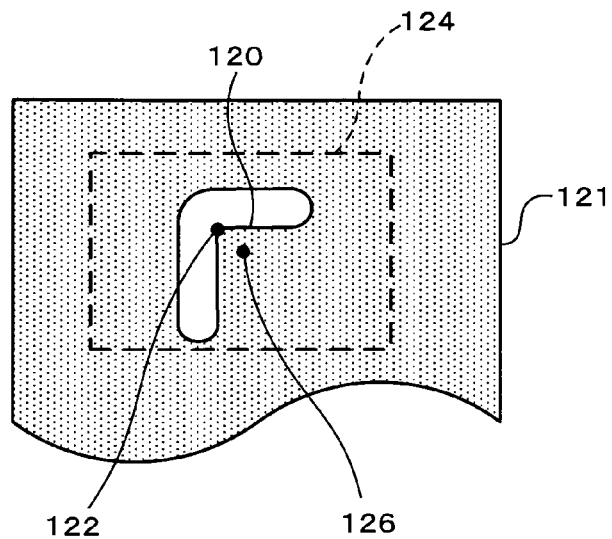
FIG. 8 is a plan view of a base material 14 for explanation of calibration of process control data.

FIG. 8 is a figure for explanation of this calibration operation. And FIG. 9 is a flow chart showing the flow of control during this calibration.

Figure 9:
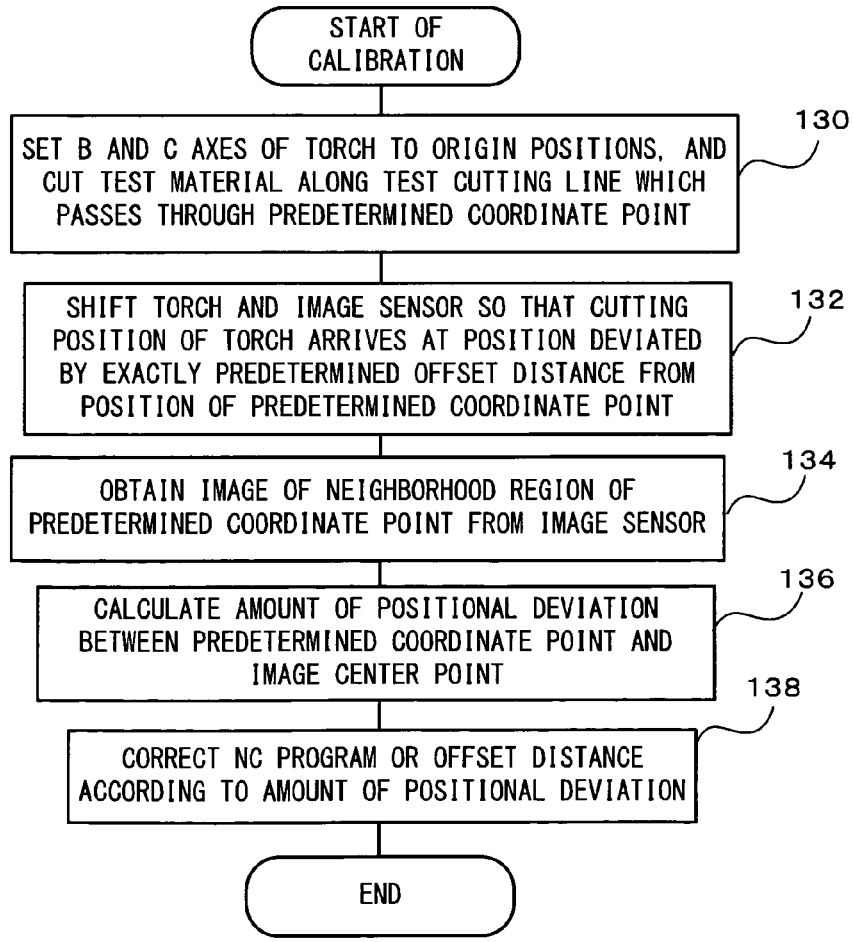
FIG. 9 is a flow chart of the control of this calibration.

As shown in FIG. 9, in this control for calibration, in a step 130, the numeric controller 320 sets the positions of the axes B and C of the tilter 26 to the origins of the B and C coordinates, and then performs so called test cutting by driving the plasma torch 28 along a test cutting line which is specified by the NC program 322, and thereby cutting some test material 121 which has been placed upon the stage (this test material 121 may be the base material 14 for cutting out the manufactured products 34, or may be some other sheet). Here, this test cutting line may be a letter-"L" shaped cutting line 120 as shown by way of example in FIG. 8, or may be a line of another shape (for example, only a simple round hole may be perforated); but, in any case, this test cutting line should pass through a position with predetermined X and Y coordinates (for example, the X-Y coordinate origin), and should have a shape such that it is possible to ascertain from an image which is photographed by the image sensor 30, where upon the test cutting line corresponds to the above described predetermined coordinate position. In the example shown in FIG. 8, the corner point 122 of the letter-"L" shaped test cutting line 120 corresponds to the above described predetermined cutting position. Accordingly, the spot upon this letter-"L" shaped test cutting line 120 which corresponds to the above described predetermined coordinate position, i.e. the corner point 122, may be found by a method similar to the method for searching for the peculiar points, described above.

Referring again to FIG. 9, when the test cutting of the step 130 is finished, in a step 132, the numeric controller 320 causes the tool shift mechanism 16 through 26 to shift so that its position, which corresponds to the cutting position of the plasma torch 28 which is set to the origins of the B and C coordinates, comes to a position which deviates from the above described predetermined coordinate position by exactly offset distances (a distance in the X direction and a distance in the Y direction) which are set in the numeric controller 320 in advance; and thereby the plasma torch 28 and the image sensor 30 shift together therewith. Here, the offset distance described above is data which specifies a distance between the center of the image capture region of the image sensor 30, and the cutting position of the plasma torch 28 which is set to the origins of the B and C coordinates. After the above described shifting has been completed, next, in a step 134, the image analysis device 324 drives the image sensor 30, and acquires an image of this image capture region from the image sensor 30. At this time, if the origins of all of the X, Y, Z, B, and C axes of the torch shift mechanism 16 through 26 are accurate, in the image 124 which is outputted, the corner point 122 of the test cutting line 120 (the spot which corresponds to the above described predetermined coordinate position) should be positioned at the center 126 of this image (the center of the image capture region of the image sensor 30). On the other hand, if the above is not the case, then, since the actual offset distance will be different from the offset distance which is stored in the numeric controller 320, accordingly, as shown in FIG. 8, in the image 124 which has been photographed, the corner point 122 of the test cutting line 120 (the spot which corresponds to the above described predetermined coordinate position) will come to be separated from the center 126 of the image 124.

Thereafter, in a step S136 of FIG. 9, the image analysis device 324 analyzes the image 124, calculates the amounts of positional deviation in the machine coordinate system between the center of the image 124 (i.e. the center of the image capture region of the image sensor 30) and the corner point 122 (the spot which corresponds to the predetermined coordinates described above) of the test cutting line 120, (in other words, the amount of positional deviation in the X direction and the amount of positional deviation in the Y direction, which are the difference between the actual offset distances and the offset distances which are stored in the numeric controller 320), and notifies these amounts of positional deviation to the NC controller 320. And, in the step 138, the NC controller 320 corrects either one of the NC program 322 (in particular, the X and Y coordinate values of the manufactured product drawing data of the manufactured products 34) and the above described offset distance by just the amount of this positional deviation. Subsequently, after cutting with the plasma torch 28 has been performed at a position which corresponds to some X and Y coordinates specified by the NC program 322, if the camera 30 is shifted by just the offset distance, then the center of the image capture region of the image sensor 30 will accurately come to be positionally matched with the cutting position which corresponds to that X and Y coordinate position. In this connection, since it is most difficult for the center of the image capture region of the image sensor 30 to be influenced by aberration of the lens system of the image sensor 30, accordingly, by performing calibration so as to match the center of the image capture region to the cutting position, it becomes possible to perform the control shown in the steps 62 through 68 of FIG. 5 at high accuracy.

Next, a plasma cutting device according to a second embodiment of the present invention will be explained. This second embodiment adds four improvements to the structure of the first embodiment as described above, and among these, three of the improvements are ones for enhancing the performance for detection of the peculiar points, while the other improvement is one for improving the performance for detection of the position and the orientation of the base material 14 upon the table 12. The first improvement for enhancing the performance of detection of the peculiar points relates to the arrangement of the image sensor 30 and to the illumination of its image capture region; the second such improvement relates to the combination of automatic detection and manual detection of the peculiar points; and the third such improvement relates to fine limitation of the image region which constitutes the subject for image analysis. In the following, each of these improvements will be explained.

Figure 10:
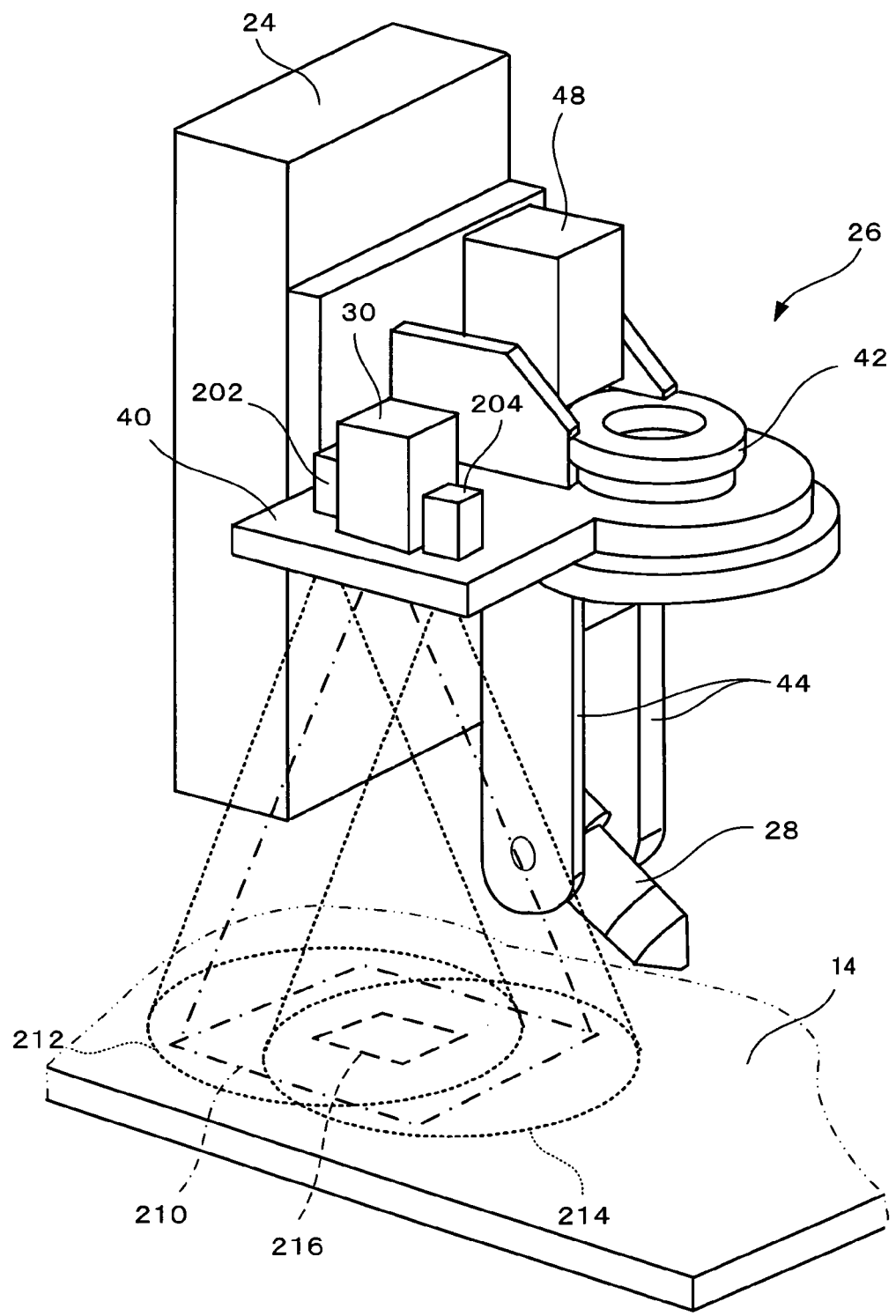
FIG. 10 is a perspective view showing the arrangement of an image sensor and a lamp, in a plasma cutting device according to a second embodiment of the present invention.

FIG. 10 shows the way in which the image sensor 30 in this second embodiment is arranged, and the method of illuminating the image capture region of the image sensor 30.

As shown in FIG. 10, the image sensor 30 is fitted to the elevator 24 (the bracket 40) which holds the plasma torch 28, so that it shifts together with the plasma torch 28 in the X, Y, and Z directions. The image sensor 30 is arranged at a position which is sufficiently higher than the plasma torch 28, so that, when the base material 14 is being cut with the plasma torch 28, droplets of molten metal which jump up from the base material 14 do not come into contact with the image sensor 30. Two lamps 202 and 204 are also fitted upon the bracket 40, in positions on both sides of the image sensor 30. These two lamps 202 and 204 illuminate the image capture region 210 of the image sensor 30 on the surface of the base material 14, from both the sides of the image capture region 210.

Fouling (for example, spatter) of the surface of the base metal 14, variation of the surface state (color, rust, or damage) of the base material 14, and poor quality of the state of illumination (lack of brightness or the presence of shadows) of the environment in which this plasma cutting device is installed or the like are causes of it being difficult to detect the peculiar point in the image of the image capture region 210 which has been obtained from the image sensor 30. By illuminating the image capture region 210 with the two lamps 202 and 204 from both its sides, the influences of these causes are reduced, and, in the image which has been photographed, the difference in intensity between the surface and the cutting grooves of the base material 14 and the manufactured product 34 becomes more clear. Due to this, the accuracy of image analysis and automatic detection of the peculiar point is enhanced.

The image of the image capture region 210 which is outputted from the image sensor 30 is analyzed by the image analysis device 324 (refer to FIG. 3). This image analysis device 324 does not analyze the entire area of the image of the image capture region 210, but rather extracts, from within this image of the image capture region 210, only an image of a smaller region 216 (hereinafter termed the "analysis region") which is close to its center, and then analyzes the image of this analysis region 216. If the picture element pitch of the image which is outputted from the image sensor 30 is, for example, about 0.1 mm (in other words its resolution is about 250 ppi), then the dimensions of the analysis region 216 may be, for example, about 2 inches×2 inches, and the pixel size of the image of this analysis region 216 may be about 200 pixels× 200 pixels. If the dimensions of the analysis region 216 and the pixel size of this image are of this order, then an extremely short time period will be sufficient for the image analysis.

It is not possible always to anticipate 100% reliability for any method for automatically detecting the peculiar points by image analysis. When an erroneous detection has occurred, if the next stage of cutting is performed based upon this erroneous detection result, then the cost, time, and work which are consumed are wasted, since the manufactured product 34 which has been cut out will becomes unusable. Due to this, it is desirable reliably to eliminate erroneous detection of the peculiar points. Thus, in this second embodiment, a function is provided by which, when there is a fear that an error in automatic detection may occur, automatic detection is not persevered with, but rather the detection mode is directly changed over from automatic detection to manual detection (i.e., designation of the peculiar point by the operator). As a variant example it would also be acceptable to arrange, if there is a possibility that the result of automatic detection will be erroneous, for retrying of the automatic detection process to be performed once or twice, and to transit to the manual detection mode if the possibility of erroneous detection is not eliminated by this retrying.

Figure 11A:
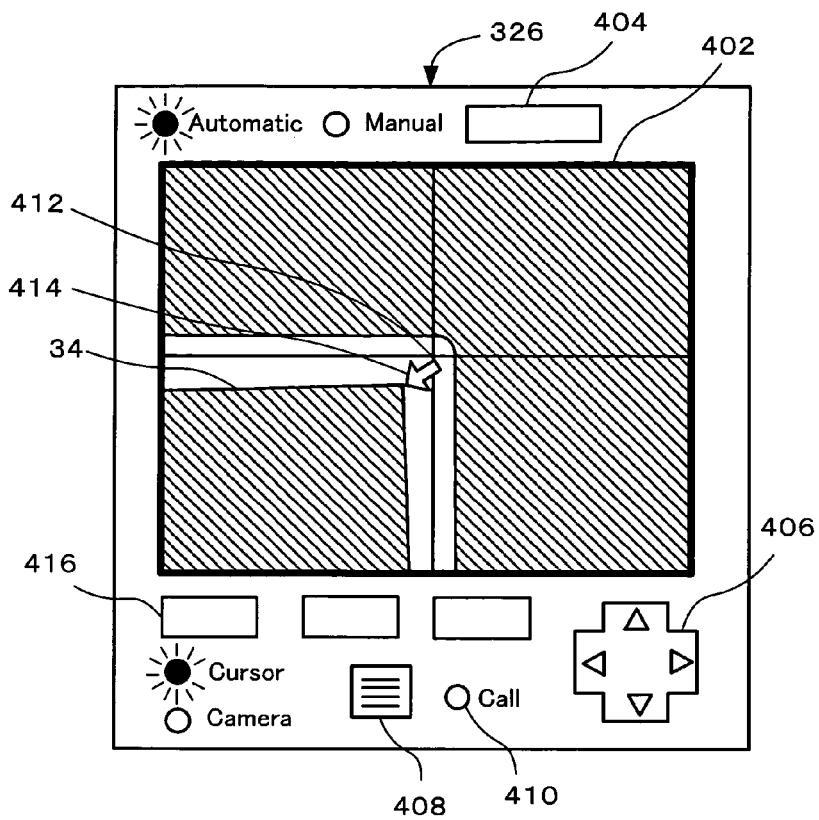
FIG. 11A is a figure showing an example of a console when automatic detection of a peculiar point is being performed in this second embodiment.
Figure 11B:
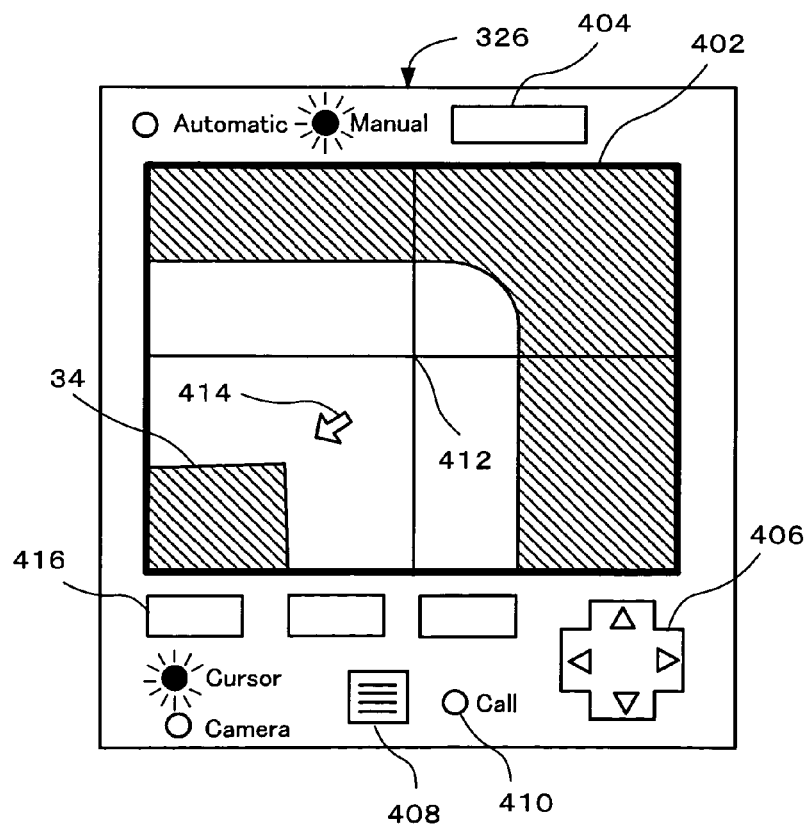
FIG. 11B is a figure showing an example of this console when manual detection of a peculiar point is being performed.

FIGS. 11A and 11B show examples of the console 326, for explanation of the function for changing over the method of detection of the peculiar points from automatic detection to manual detection.

As shown in FIGS. 11A and 11B, on the console 326, there are provided a display screen 402, an automatic/manual changeover button 404, a shift button 406, an audio warning device 408, and a call lamp 410. When the image analysis device 324 is performing automatic detection of the peculiar point by image analysis (which is the automatic detection mode), as shown in FIG. 11A, this image analysis device 324 displays an image of the analysis range 216 upon the display screen 402, and positions the proper position of the peculiar point, as specified by the NC program, at the center 412 of the display screen 402. A cursor 414 for indicating the peculiar point is also displayed upon the display screen 402. When the image analysis device 324 detects the position of the peculiar point by image analysis, it also decides whether or not there is a possibility that this detection is erroneous. For example, if the distance between the position of the peculiar point which has been detected and its proper position is greater than a predetermined threshold value (for example, a value of the order of the maximum width of the cutting groove which is set in advance), then it is decided that there is a possibility that this detection is erroneous, since there is almost no possibility that the position of the peculiar point should deviate as much as this. If in this manner it has been decided that there is a possibility of erroneous detection, then the image analysis device 324 drives the audio warning device 408 and the call lamp 410 of the console 326 to summon the operator, and the flow of control does not proceed, but waits until a command is inputted from the operator.

When, subsequently, the operator presses the automatic/manual changeover button 404 upon the console 326, the image analysis device 324 changes over from the automatic detection mode to the manual detection mode, and, as shown in FIG. 11B, it is arranged to magnify the image displayed upon the display screen 402, so as to display the region in the neighborhood of the peculiar point in more detail. And, by the operator actuating the shift button 406, he can shift the cursor 414, so as to indicate the position of the peculiar point upon the display screen 402 with the cursor 414. Or, if a touch sensor panel is provided upon the display screen 402, then the operator is also able to indicate the position of the peculiar point upon the display screen 402 directly with a fingertip or the end of a pen or the like. Or he could also shift the cursor 414 with a mouse, not shown in the figures. In any of these cases, when the position of the peculiar point upon the display screen 402 is indicated by the operator, the image analysis device 324 takes, not the position which was obtained by automatic detection, but rather the position which has been indicated by the operator, as being the position of the peculiar point, and calculates its machine coordinates and notifies them to the numeric controller 320.

Figure 12:
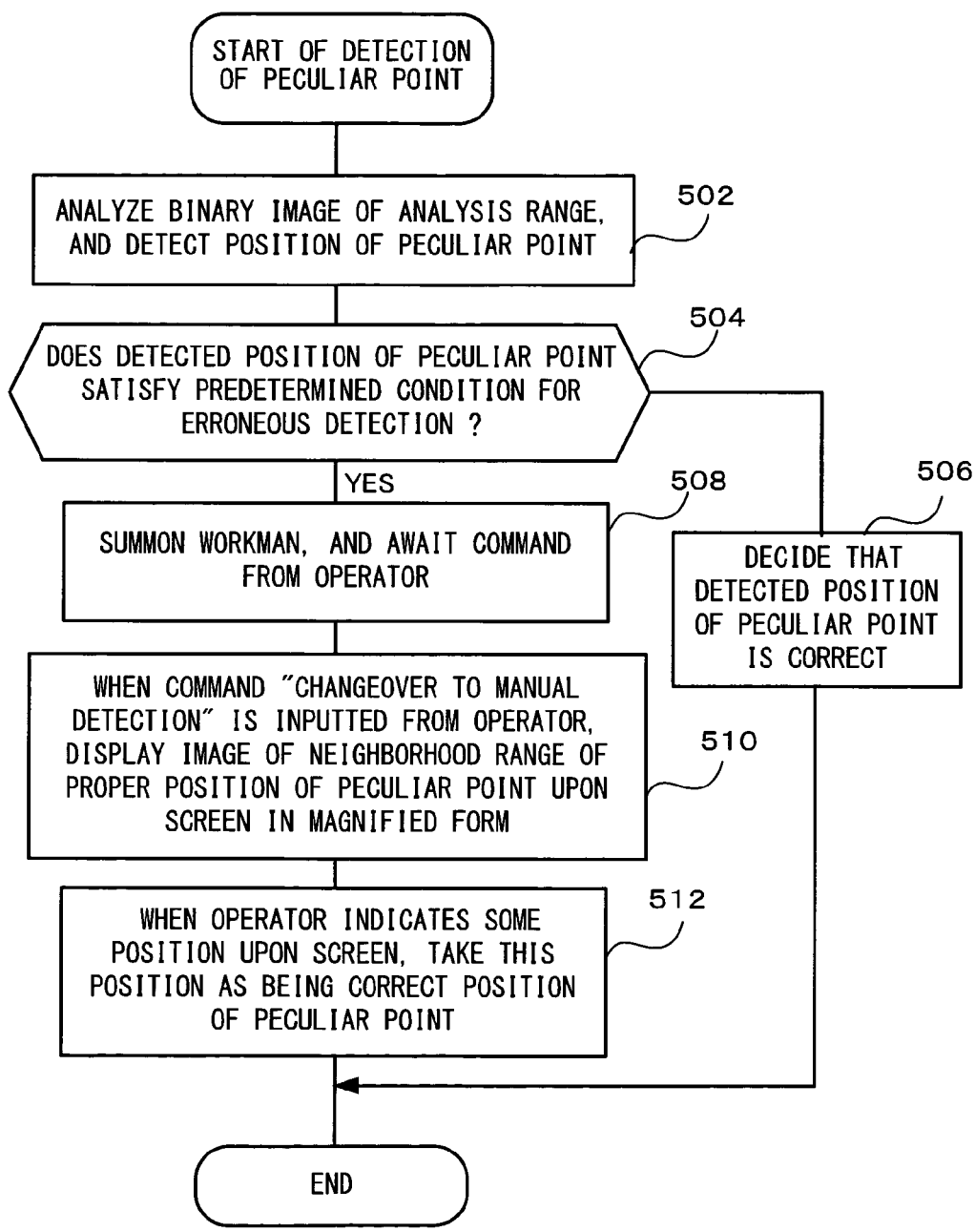
FIG. 12 is a figure showing the flow of control for detecting a peculiar point, in this second embodiment.

FIG. 12 shows the flow of processing performed by the image analysis device 324 for peculiar point detection, and, in this flow, control is also included for changing over, as described above, from the automatic detection mode to the manual detection mode. This flow corresponds to the step 63 in the flow for control of beveling shown in FIG. 5.

As shown in FIG. 12, in a step 502, the image analysis device 324 analyzes the binary image of the analysis range, and detects the position of the peculiar point. And, in a step 504, the image analysis device 324 checks whether the position of the peculiar point which has thus been detected satisfies a predetermined erroneous detection condition. This predetermined erroneous detection condition may be, for example, as described above, the condition that the distance between the position of the peculiar point which has been detected and its proper position is greater than a predetermined threshold value (for example, a value of the order of the maximum width of the cutting groove which is set in advance). It should be understood that it would also be acceptable for some other condition to be imposed, in addition to this condition. If the result of this checking is NO, then it is decided that the position of the peculiar point which has been detected is correct (a step 506), while if the result is YES, then it is decided that there is a possibility that the position of the peculiar point which has been detected is erroneous, and the flow of control proceeds to a step 508.

In this step 508, the image analysis device 324 summons the operator, and waits quietly for a command to be inputted from the operator. And when, in a step 510, a command is inputted from the operator to change over to manual detection, the image analysis device 324 displays an image of the proper position of the peculiar point in magnified form upon the display screen 402. Thereafter when, in a step 512, the operator indicates some position upon the display screen 402, the image analysis device 324 takes this position which has thus been indicated as being the correct position of the peculiar point.

By using a combination of automatic detection and manual detection in this manner, it is possible reliably to discover the position of the peculiar point. The manual detection of the peculiar point during manual detection is simple, due to the use of this method in which the operator indicates the position of the peculiar point upon the image displayed upon the display screen 402.

Now, the above described method in which an image which has been photographed is displayed upon the display screen 402, and the operator indicates a desired position upon this image, can be applied, not only to the detection of the peculiar point, but also for detection of the position of the base material 14 upon the stage 12 before the start of processing (for example, detection of the X and Y coordinates of its origin) and detection of its orientation (for example, detection of the angle of inclination of one side of the base material 14 with respect to the X axis or the Y axis).

Figure 13:
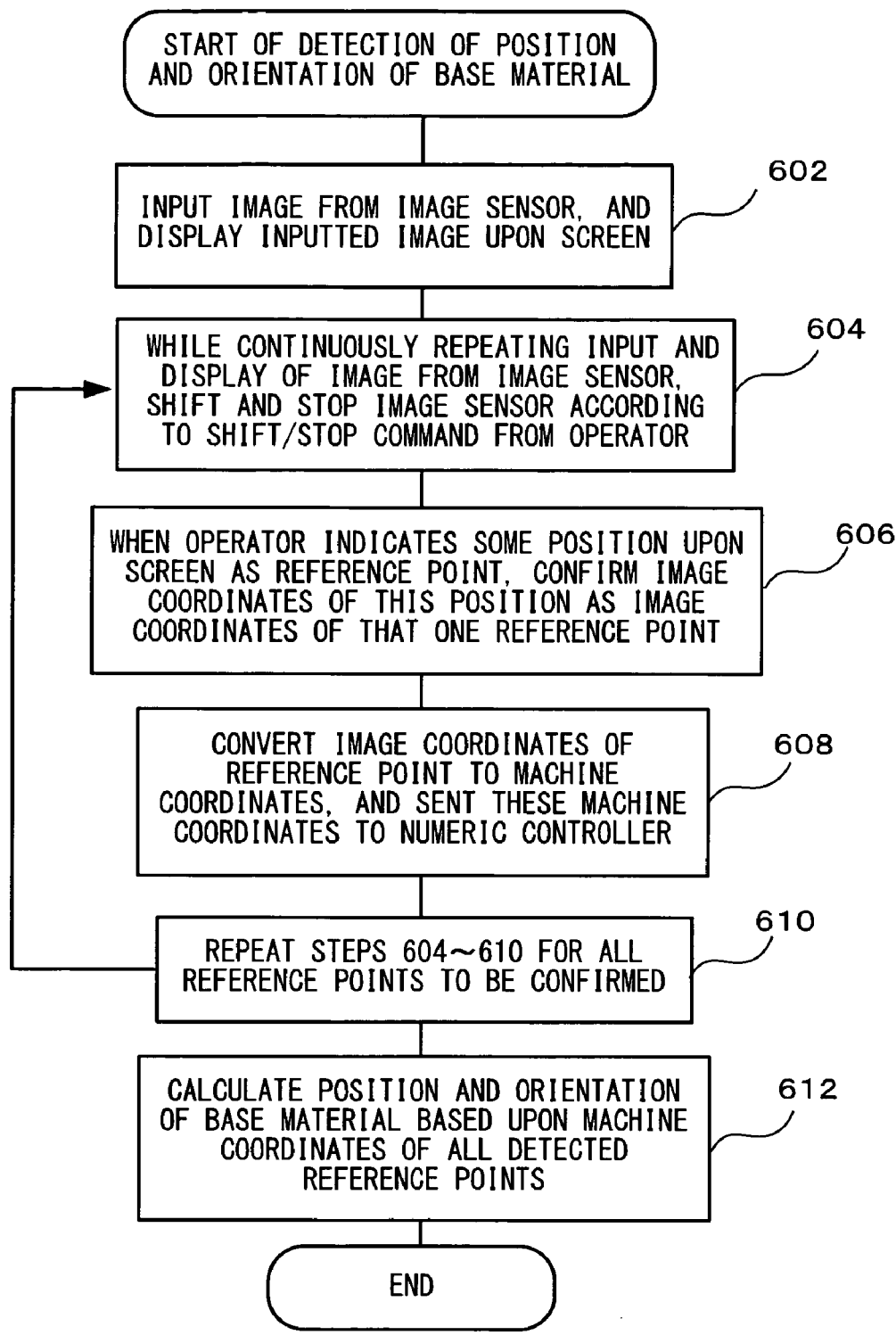
FIG. 13 is a figure showing the flow of control for detecting the coordinates of the origin and the orientation of the base material, in this second embodiment.

FIG. 13 shows the flow of control, in this second embodiment, for detecting the position and the orientation of the base material 14 by using an image which has been photographed by the image sensor 30.

When the control shown in FIG. 13 is started, in a step 602, the image analysis unit 324 drives the image sensor 30 and inputs an image of the image capture range of the image sensor 30, and displays the image which has thus been inputted upon the display screen 402 of the console 326. The operator actuates the cursor/camera changeover button 416 on the console 326 shown by way of example in FIG. 11A or FIG. 11B, and changes over the subject which can be shifted by the shift button 406 from the cursor 414 to the camera, in other words to the image sensor 30. Thereafter, in a step 604, when the operator actuates the shift button upon the console 326 and inputs a shift command, the numeric controller 320 shifts the image sensor 30 in the X direction and/or the Y direction according to this shift command. And, continuously while this control is being performed from start to finish, the image analysis unit 324 repeats, upon a high speed cycle, the input of an image of the image capture range from the image sensor 30 and the display thereof upon the display screen 402, so that thereby an image (a moving image) of the image capture range which corresponds to the current position of the image sensor 30 is displayed in real time upon the display screen 402. And, by actuating the shift button 406 while looking at the image upon the display screen 402, the operator is able simply to perform shifting of the image sensor 30 to any desired position (even if this position is far away from the operator). At a time point when one reference point upon the base material 14 (typically one of its corner points) is displayed upon the display screen 402, the operator actuates the shift button 406 and inputs a stop command. And, in response to this stop command, the numeric controller 320 stops the shifting of the image sensor 30.

When the shifting of the image sensor 30 is stopped, in a step 606, the operator actuates the cursor/camera changeover button 416 upon the console 326 and changes over the subject which is to be shifted with the shift button 406 from the image sensor 30 to the cursor 414, and then actuates the cursor 414 with the shift button 406, thus indicating the position of a reference point upon the base material 14 (a corner point thereof) which is being displayed upon the display screen 402. Or, it would also be acceptable for the operator to actuate the cursor 414 with a mouse, not shown in the figures; or, if the display screen 402 is provided with a touch sensor panel, it would also be acceptable for the operator to indicate the position of the reference point upon the display screen 402 directly with his fingertip or with the end of a pen or the like. With this method of indicating the reference point upon the image which is displayed upon the display screen 402 in this manner, it is possible for the operator simply to indicate the reference point, even if the reference point is far away from the operator, or if the illumination of the environment is dark. When some position on the base material 14 displayed upon the display screen is indicated by the operator in this manner, the image analysis device 324 confirms the image coordinates of this position which has been indicated as being the image coordinates of some reference point upon the base material 14. And, in a step 608, the image analysis device 324 converts the image coordinates of this reference point which has thus been confirmed into machine coordinates, and transmits these machine coordinates to the numeric controller 320.

The processing of the above described steps from 604 through 610 is repeated for all of the reference points which are to be confirmed (for example, for three of the corner points of the base material 14). As a result, the numeric controller 320 acquires the machine coordinates of all of the reference points upon the base material 14. Thereafter, based upon these machine coordinates of all of the reference points upon the base material 14, the numeric controller 320 calculates the position (for example, the X and Y coordinates of the origin of the base material 14) and the orientation (for example, the angle of inclination of one side of the base material 14 which passes through the origin with respect to the X axis or to the Y axis) of the base material 14. The position and the orientation of the base material 14 which have been determined in this manner are used by the numeric controller 320 in the cutting processes which are subsequently performed (refer to FIG. 5), and thereby, when cutting out the manufactured products from the base material 14 according to the NC program, whatever positional relationship the base material 14 may be positioned at with respect to the machine coordinate system, the numeric controller 320 controls the position at which the base material 14 is cut to the position which is designated by the NC program.

By the method, as described above, of teaching the reference points upon the base material to the numeric controller by the operator indicating a point within the image which is being displayed upon the screen, it is possible to apply the function of performing beveling, not only with an automatic cutter which is endowed with a function of performing beveling, but also to an automatic cutting device which has no function of performing beveling, and this is extremely useful. Some types of devices such as large sized plasma cutters are not equipped with any tool or stopper for performing positional determination of the base material upon the table. With this type of machine, a special job is required for teaching the numeric controller the positional relationship between the machine coordinate system and the base material. In the prior art, a method is employed in which the operator teaches the coordinates of these corner points to the numeric controller by slowly shifting a laser pointer, whose positional relationship with the cutting tool is ascertained by the numeric controller in advance, to the corner points of the base material manually with a jog mechanism. Or a method is also employed of displaying upon a screen an image from a CCD camera which is photographing the base material, and of the operator manually shifting the CCD camera with a jog mechanism until a corner point of the base material within the displayed image arrives at the position of a marked point at the center of the screen. However, with either of these prior art methods, the task is required of shifting the laser pointer or the CCD camera slowly and carefully with the jog mechanism, and this takes a considerable period of time and imposes trouble upon the operator. By contrast since, according to the method shown in FIG. 13, it is sufficient merely for the reference point upon the base material (for example, its corner point) to be brought to within the image capture region of the image sensor (which is, for example, a CCD camera), accordingly it is possible to shift the image sensor more roughly and at a higher speed, and the actuation which must be performed by the operator is more simple.

Moreover, this method of teaching the reference points upon the base material to the numeric controller by the operator designating a point within the display image as described above may be applied, not only to the objective of teaching the position and the orientation of the base material to the controller, but also to some other objective. For example in a case, not of performing cutting automatically by execution of an NC program, but of performing manual cutting in which the base material is cut along points or lines which are designated by the operator upon the base material, then this method may also be applied to the objective of the operator teaching the coordinates of the points or lines (i.e. of the points for defining such lines) at which this cutting is to be performed to the controller. In this case if, for example, a workman designates any desired one or more points within the image of the image capture region which is being displayed, while actuating a jog mechanism to shift the image capture region of the image sensor over the base material, then the controller is able to ascertain the coordinates of the various points which are indicated as being the coordinates of the reference points (the points which define the points which are to be cut or the lines which are to be cut), and is able to perform the cutting operation by shifting the cutting tool according to the coordinates of these reference points which have thus been ascertained.

Although various embodiments of the present invention have been described above, these are only given for the purposes of explanation of the present invention, and the range of the present invention is not to be considered as being limited only to these embodiments. Provided that the gist of the present invention is not departed from, it would also be possible to implement the present invention in various other manners.

The invention claimed is:

1. An automatic cutting device comprising:
a stage for a base material to be placed upon;
a cutting tool;
an image sensor which has an image capture region;
a tool shift mechanism for, with respect to said stage, shifting said cutting tool, changing an angle of said cutting tool, and moreover shifting a photographic region of said image sensor; and
a controller which controls an operation of each of said cutting tool, said image sensor, and said tool shift mechanism, according to an NC program;
wherein said controller comprises:
a first cutting sub-process control means which, according to said NC program, performs control so as to execute a first cutting sub-process of cutting said base material which has been placed upon said stage with said cutting tool and cutting out a manufactured product;
an image capture control means which, after said first cutting sub-process has been executed, performs control so as to set said image capture region of said image sensor to at least a single region which includes proper positions of at least two peculiar points upon said manufactured product, which has been cut out, upon said stage which are defined by said NC program, and so as to acquire from said image sensor an image of said at least a single region;
a peculiar point detection means which analyzes said image of said at least a single region which has been acquired by said image sensor, and detects actual positions on said stage of said at least two peculiar points of said manufactured product which has been cut out;
a program correction means which corrects said NC program so as to match it to the actual position of said manufactured product, which has been cut out, on said stage, according to said actual positions of said peculiar points which have been detected; and
a second cutting sub-process control means which, according to said corrected NC program, performs control so as to execute a second cutting sub-process of performing additional cutting with said cutting tool upon said manufactured product, which has been cut out, on said stage.

2. The automatic cutting device according to claim 1, wherein at least two corner points of an external outline of said manufactured product are chosen as said at least two peculiar points.

3. The automatic cutting device according to claim 2, wherein said peculiar point detection means detects, from within said image of said at least a single region, a plurality of line segments which constitute the external outline of said manufactured product which has been cut out, and detects at least two corner points which are formed by the intersection of a plurality of said line segments which have been detected, as being the actual positions of said at least two peculiar points.

4. The automatic cutting device according to claim 1, wherein said peculiar point detection means applies a predetermined picture element value matrix which specifies a shape of a neighborhood, upon a manufactured product drawing which is defined by said NC program, of each of said proper positions of said at least two peculiar points, to various positions within said image of said at least a single region, calculates a degree of pattern matching at said various positions within said image with said picture element value matrix, and detects one position at which said calculated degree of pattern matching is maximum, as being each of the actual positions of said at least two peculiar points.

5. The automatic cutting device according to claim 1, wherein said program correction means corrects said NC program, based upon a positional relationship between the actual detected positions of said peculiar points, and said proper positions of said peculiar points.

6. The automatic cutting device according to claim 1, wherein said peculiar point detection means limits a range for detection of said actual positions of said at least two peculiar points within said image of said at least a single region, to only neighborhood ranges of said proper positions of said at least two peculiar points.

7. The automatic cutting device according to claim 1, wherein said controller further comprises:
   a means which decides whether or not an amount of positional deviation of said manufactured product which has been cut out is excessively great, based upon the positional relationship between the actual detected positions of said peculiar points, and said proper positions of said peculiar points; and
   a means which cancels the execution of said second cutting process upon said manufactured product which has been cut out, if it has been decided that said amount of positional deviation is excessively great.

8. The automatic cutting device according to claim 1, wherein said cutting tool and said image capture region of said image sensor are maintained in a fixed positional relationship, and are shifted together with one another by said tool shift mechanism.

9. The automatic cutting device according to claim 1, wherein said controller further comprises:
   a means which performs control so as to execute, using said cutting tool, test cutting in which test material which has been placed upon said stage is cut along a test cutting line passing through a predetermined coordinate point which has been designated by said NC program;
   a means which, after said test cutting has been executed, performs control so as, based upon predetermined offset data which specifies a positional relationship between the cutting position of said cutting tool and said image capture region of said image sensor, to shift said image capture region of said image sensor to a region which includes said predetermined coordinate point, and so as to acquire from said image sensor an image of said region including said predetermined coordinate point;
   a means which analyzes the image of said region including said predetermined coordinate point, which has been acquired from said image sensor, and detects an actual positional relationship between said cutting tool and said image capture region of said image sensor, and
   a means which corrects said NC program or said offset data, based upon said actual positional relationship which has been detected.

10. The automatic cutting device according to claim 1, further comprising two or more lamps which illuminate said image capture region of said image sensor from its both sides.

11. The automatic cutting device according to claim 1, wherein said image sensor is arranged at a position which is sufficiently higher than said cutting tool for metallic droplets which jump up from said base material during cutting of said base material, not to come into contact with said image sensor.

12. The automatic cutting device according to claim 1, wherein said peculiar point detection means limits the region, within the image of said image capture region which is acquired from said image sensor, over which image analysis for detection of the actual positions of said peculiar points is performed, to only a partial region in the neighborhoods of said proper positions of said peculiar points.

13. The automatic cutting device according to claim 1, further comprising:
   a display screen; and
   a peculiar point designation means for an operator to designate a desired position upon the image which is displayed upon said display screen as being each of said peculiar points;
   and wherein said peculiar point detection means further comprises:
   a check means which checks whether or not said actual position of said each peculiar point, detected by analysis of said images acquired from said image sensor, satisfies a predetermined erroneous detection condition;
   a means which, if a result of said check is YES, displays upon said display screen said image which has been acquired by said image sensor; and
   a means which, if said operator has designated any desired position upon said image which has been displayed upon said display screen using said peculiar point designation means, detects said designated position as being the actual position of said each peculiar point.

14. The automatic cutting device according to claim 13, further comprising a means for summoning the operator; and wherein said peculiar point detection means comprises a means for driving said means for summoning the operator if the result of said check is YES.

15. The automatic cutting device according to claim 13, wherein said means which displays said images upon said display screen comprises a means for magnifying said images which have been displayed upon said display screen.

16. An automatic cutting device, comprising:
   a stage for a base material to be placed upon;
   a cutting tool;
   an image sensor, having an image capture region, for photographing a, photographic region upon said stage;
   a tool shift mechanism for, with respect to said stage, shifting said cutting tool, and moreover shifting said photographic region of said image sensor;
   a display screen for displaying an image of said photographic, region which is outputted from said image sensor;
   a reference point designation means for an operator to designate any desired position upon the image displayed upon said display screen as a reference point upon said base material;

a shift/stop command input means for said operator to input a shift command for shifting said image capture region of said image sensor, and a stop command for stopping the shifting of said image capture region; and a controller which controls an operation of each of said cutting tool, said image sensor, and said tool shift mechanism;

and wherein said controller comprises:

an image capture region shift control means which, if said operator has inputted said shift command using said shift command input means, performs control so as to shift said image capture region of said input image sensor in response to said shift command which has been inputted; and, if said operator has inputted said stop command using said shift command input means performs control so as to stop the shifting of said image capture region of said input image sensor in response to said stop command which has been inputted;

a display control means which acquires an image of said image capture region from said image sensor, and displays it upon said display screen; and a reference point detection means which, when the shifting of said image capture region of said image sensor is stopped, if said operator has designated, using said reference point designation means, a desired point upon said image of said image capture region which is displayed upon said display screen, detects coordinates of said designated point as being coordinates of a reference point upon said base material.

17. A production method for a beveled product using a single automatic cutting device which operates according to an NC program, comprising:

a step of cutting a base material which has been set upon said automatic cutting device, according to the NC program, and cutting out a manufactured product;

a step of, after the cutting out of said manufactured product has been completed, acquiring, using an image sensor, an image of at least a single region which includes proper positions, defined by said NC program, of at least two peculiar points upon said manufactured product which has been cut out;

a step of analyzing said image of said at least a single region which has been acquired by said image sensor, and detecting actual positions of said at least two peculiar points of said manufactured product which has been cut out;

a step of correcting said NC program so as to match it to actual position of said manufactured product which has been cut out, according to said actual positions of said at least two peculiar points which have been detected; and a step of performing additional cutting upon said manufactured product which has been cut out, according to said corrected NC program.

* * * * *